US010831290B2

(12) United States Patent
Panchawagh et al.

(10) Patent No.: US 10,831,290 B2
(45) Date of Patent: Nov. 10, 2020

(54) STYLUS-TRACKING PIEZOELECTRIC SENSOR

(71) Applicant: QUALCOMM Incorporated, San Diego, CA (US)

(72) Inventors: Hrishikesh Vijaykumar Panchawagh, Cupertino, CA (US); Kostadin Dimitrov Djordjev, Los Gatos, CA (US); Changting Xu, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/283,620

(22) Filed: Feb. 22, 2019

(65) Prior Publication Data
US 2020/0272255 A1   Aug. 27, 2020

(51) Int. Cl.
G06F 3/041 (2006.01)
G06F 3/0354 (2013.01)
G06F 3/038 (2013.01)

(52) U.S. Cl.
CPC ........ *G06F 3/03545* (2013.01); *G06F 3/0383* (2013.01); *G06F 3/0412* (2013.01); *G06F 3/0416* (2013.01)

(58) Field of Classification Search
CPC .. G06F 3/03545; G06F 3/0412; G06F 3/0383; G06F 3/0416
See application file for complete search history.

(56) References Cited

U.S. PATENT DOCUMENTS

| 6,118,889 | A * | 9/2000 | Izuno | G06K 9/00154 |
| | | | | 382/119 |
| 8,429,078 | B2 * | 4/2013 | Evans | G06Q 20/40145 |
| | | | | 705/44 |
| 9,785,272 | B1 * | 10/2017 | Rosenberg | G06F 3/04166 |
| 10,043,056 | B1 * | 8/2018 | Danyluk | G06K 9/00174 |
| 10,466,844 | B1 * | 11/2019 | Tang | B25J 13/084 |
| 2006/0070260 | A1 * | 4/2006 | Cavanagh | A61B 5/1036 |
| | | | | 36/44 |
| 2009/0174679 | A1 * | 7/2009 | Westerman | G06F 3/0418 |
| | | | | 345/173 |
| 2009/0278792 | A1 * | 11/2009 | Toebes | G06F 21/83 |
| | | | | 345/156 |
| 2011/0074701 | A1 * | 3/2011 | Dickinson | G06F 3/041 |
| | | | | 345/173 |

(Continued)

*Primary Examiner* — Jose R Soto Lopez

(74) *Attorney, Agent, or Firm* — Weaver Austin Villeneuve & Sampson LLP

(57) ABSTRACT

A stylus-tracking device may include a piezoelectric receiver or transceiver array on a first side (e.g., underneath) a display. Image data may be acquired from the piezoelectric receiver array. The image data may correspond to signals produced by the piezoelectric receiver array in response to an acoustic signal and/or a mechanical deformation caused by a target object (e.g., a stylus) in contact with a surface, such as a cover glass, proximate a second side of the display. A doublet pattern in the image data may include a first area of having signals below a threshold level and a second area having signals above the threshold level. Based on one or more doublet pattern characteristics, a position of the target object on the surface, a force of the target object on the surface and/or a first direction of movement of the target object relative to the surface may be estimated.

27 Claims, 18 Drawing Sheets

(56) References Cited

U.S. PATENT DOCUMENTS

| | | | |
|---|---|---|---|
| 2011/0175832 A1* | 7/2011 | Miyazawa | G06F 3/041 345/173 |
| 2012/0038584 A1* | 2/2012 | Liu | G06F 3/0416 345/174 |
| 2012/0068964 A1* | 3/2012 | Wright | G06F 3/03545 345/174 |
| 2012/0116972 A1* | 5/2012 | Walker | G06Q 20/40 705/44 |
| 2012/0254747 A1* | 10/2012 | Bocirnea | G06F 3/04845 715/702 |
| 2013/0076206 A1* | 3/2013 | Rosenberg | G06F 3/016 310/319 |
| 2014/0104191 A1* | 4/2014 | Davidson | G06F 3/03545 345/173 |
| 2014/0104193 A1* | 4/2014 | Davidson | G06F 3/0418 345/173 |
| 2014/0104225 A1* | 4/2014 | Davidson | G06F 3/0418 345/174 |
| 2014/0168142 A1* | 6/2014 | Sasselli | G06F 3/0416 345/174 |
| 2014/0267078 A1* | 9/2014 | Kukulski | G06F 3/0442 345/173 |
| 2014/0347316 A1* | 11/2014 | Yeh | G06F 3/044 345/174 |
| 2015/0123931 A1* | 5/2015 | Kitchens | G06F 3/0414 345/174 |
| 2015/0161369 A1* | 6/2015 | Weksler | G06F 21/32 726/19 |
| 2015/0261367 A1* | 9/2015 | Zhang | H01L 27/124 345/173 |
| 2015/0331517 A1* | 11/2015 | Filiz | G06F 3/044 345/173 |
| 2015/0338949 A1* | 11/2015 | Westerman | G06F 3/0488 345/174 |
| 2015/0338991 A1* | 11/2015 | Westerman | G06F 3/0418 345/178 |
| 2016/0034131 A1* | 2/2016 | Kosaka | G06F 3/0486 715/765 |
| 2016/0209961 A1* | 7/2016 | Ahn | G06F 3/0414 |
| 2016/0259442 A1* | 9/2016 | Ukai | G06F 3/044 |
| 2016/0266719 A1* | 9/2016 | Chang | G06F 3/044 |
| 2016/0266720 A1* | 9/2016 | Chang | G06F 3/0488 |
| 2016/0320895 A1* | 11/2016 | Ribeiro | G06F 3/0416 |
| 2017/0083135 A1* | 3/2017 | Sheik-Nainar | G06F 3/0412 |
| 2017/0153739 A1* | 6/2017 | Ahn | G06F 3/045 |
| 2017/0168574 A1* | 6/2017 | Zhang | G06F 3/0416 |
| 2017/0212627 A1* | 7/2017 | Lu | G06F 3/0416 |
| 2017/0228072 A1* | 8/2017 | Amin | H01L 41/187 |
| 2017/0357403 A1* | 12/2017 | Geary | G06F 3/0488 |
| 2018/0032209 A1* | 2/2018 | Suzuki | G06F 3/04144 |
| 2018/0059866 A1* | 3/2018 | Drake | G06F 3/017 |
| 2018/0074637 A1* | 3/2018 | Rosenberg | G06F 3/0418 |
| 2018/0074645 A1* | 3/2018 | Lin | G06F 3/0416 |
| 2018/0074692 A1* | 3/2018 | Lin | G06F 1/1692 |
| 2018/0074694 A1* | 3/2018 | Lehmann | G06F 3/0414 |
| 2018/0081441 A1* | 3/2018 | Pedder | G06F 3/044 |
| 2018/0095574 A1* | 4/2018 | Kim | G06F 3/0416 |
| 2019/0227649 A1* | 7/2019 | Micci | G01L 1/16 |
| 2019/0302960 A1* | 10/2019 | Schropp, Jr. | G06F 3/044 |
| 2019/0324569 A1* | 10/2019 | Ma | G06F 3/0412 |
| 2019/0354209 A1* | 11/2019 | Tang | G01S 7/52036 |
| 2019/0354210 A1* | 11/2019 | Akhbari | G06F 3/0436 |
| 2019/0354238 A1* | 11/2019 | Akhbari | G06F 3/0416 |
| 2019/0361563 A1* | 11/2019 | Yang | G06F 3/0446 |
| 2020/0022084 A1* | 1/2020 | Zhang | G06K 9/00013 |
| 2020/0022085 A1* | 1/2020 | Zhang | G06F 1/1643 |
| 2020/0064985 A1* | 2/2020 | Mannby | G06F 3/03545 |
| 2020/0081491 A1* | 3/2020 | Murata | G06F 3/04186 |

* cited by examiner

200

203 — Acquire first image data from at least a first portion of a piezoelectric receiver array coupled to a first side of a display, the first image data corresponding to signals produced by at least the first portion of the piezoelectric receiver array in response to at least one of an acoustic signal or a mechanical deformation caused by a target object in contact with a surface proximate a second side of the display during a first acquisition time window

205 — Detect a first doublet pattern in the first image data, the first doublet pattern comprising a first area of the piezoelectric receiver array from which signals below a threshold signal level have been received and a second area of the piezoelectric receiver array from which signals above the threshold signal level have been received, the first area being adjacent to the second area

207 — Determine one or more first doublet pattern characteristics

209 — Determine, based on at least one first doublet pattern characteristic, a first position of the target object on the surface, a first force of the target object on the surface and/or a first direction of movement of the target object relative to the surface

*Figure 2*

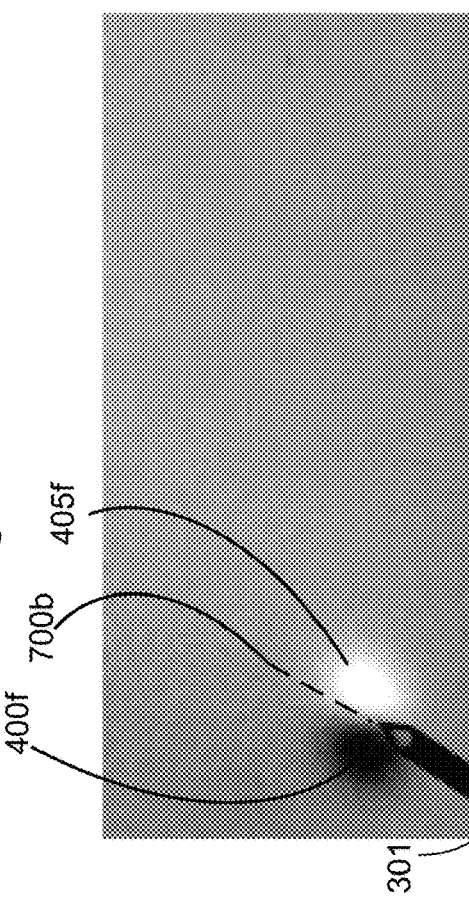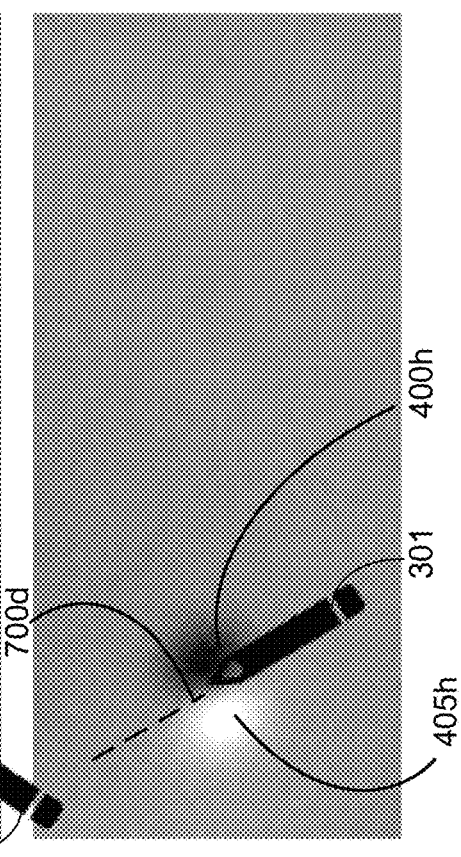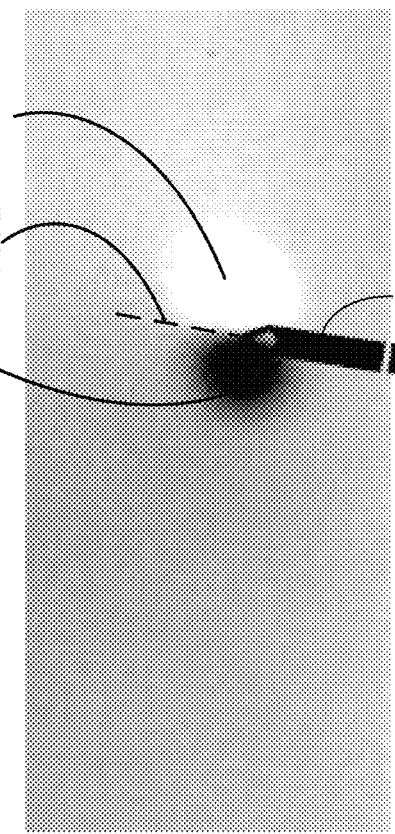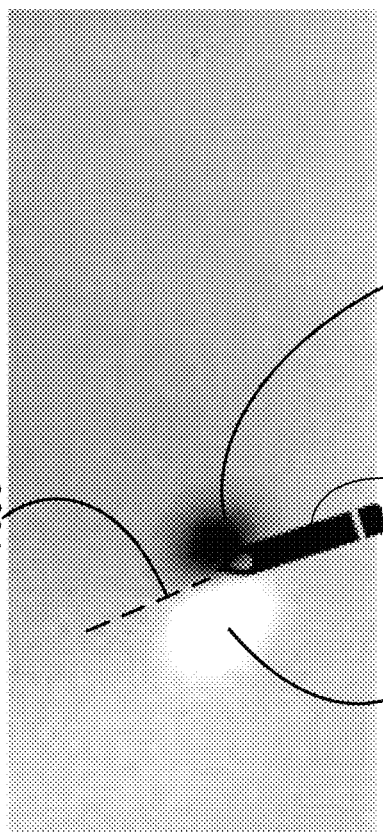

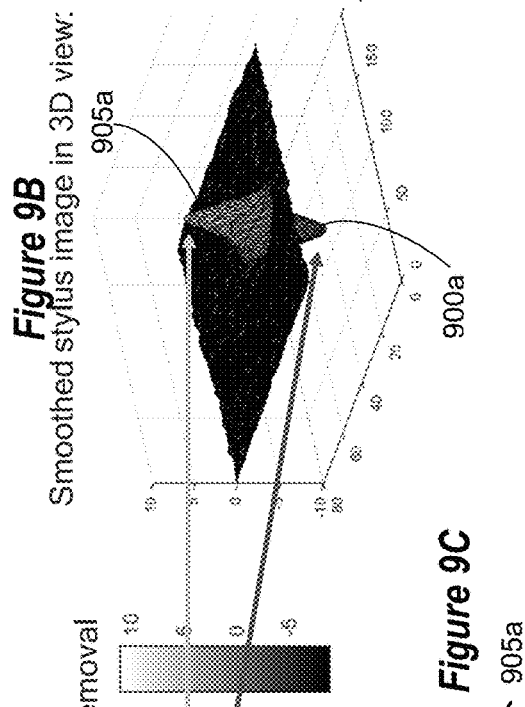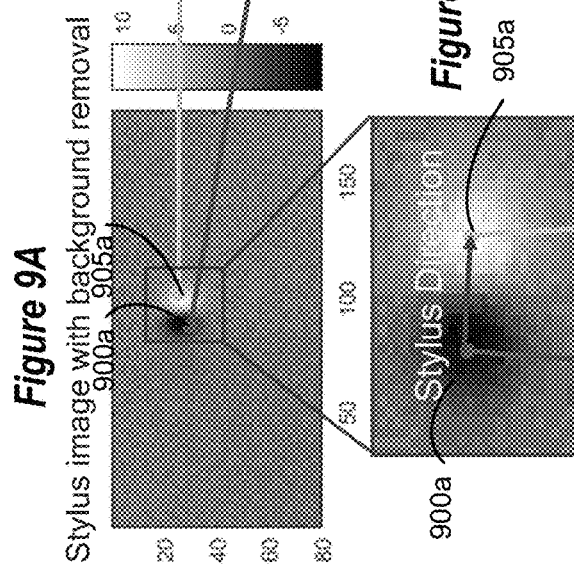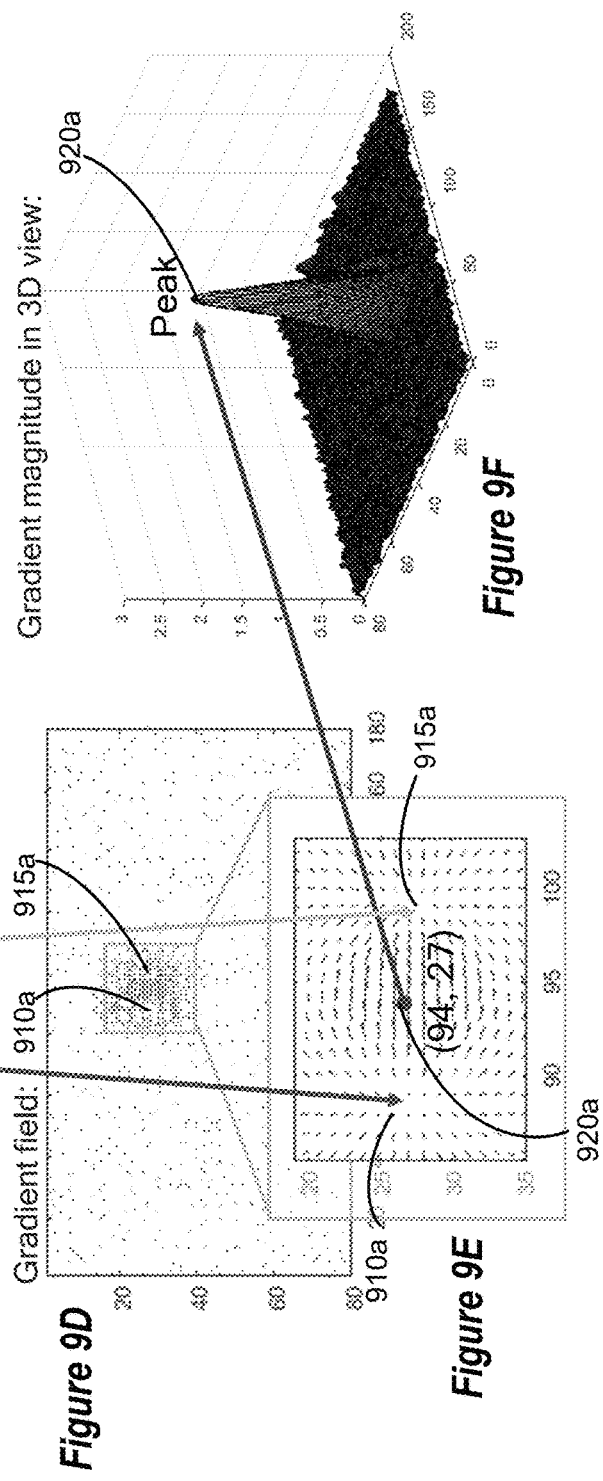
*Figure 9B* Smoothed stylus image in 3D view.
*Figure 9A* Stylus image with background removal
*Figure 9C* Stylus image
*Figure 9D* Gradient field
*Figure 9E*
*Figure 9F* Gradient magnitude in 3D view.

STYLUS-TRACKING PIEZOELECTRIC SENSOR

TECHNICAL FIELD

This disclosure relates generally to sensor devices and related methods, including but not limited to piezoelectric sensor systems and methods for using such systems.

DESCRIPTION OF THE RELATED TECHNOLOGY

Tracking of stylus movement on display devices can be an important feature, particularly for mobile devices. Many existing products include stylus-tracking features. Existing stylus-tracking technologies generally use electromagnetic fields, electrostatic fields, resistive sensing, etc. Although some existing stylus-tracking devices provide satisfactory performance, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include a piezoelectric receiver array configured to be coupled to a first side of a display and a control system that is configured for communication with the piezoelectric receiver array. In some examples, at least a portion of the control system may be coupled to the piezoelectric receiver array. In some implementations, a mobile device may be, or may include, the apparatus. For example, a mobile device may include an apparatus as disclosed herein. According to some examples, a display device may include the apparatus.

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured to acquire first image data from at least a first portion of the piezoelectric receiver array. The first image data may correspond to signals produced by at least the first portion of the piezoelectric receiver array in response to an acoustic signal and/or a mechanical deformation caused by a target object in contact with a surface proximate a second side of the display during a first acquisition time window.

In some examples, the control system may be configured to detect a first doublet pattern in the first image data. The first doublet pattern may include a first area of the piezoelectric receiver array from which signals below a threshold signal level have been received and a second area of the piezoelectric receiver array from which signals above the threshold signal level have been received. The first area may be adjacent to the second area.

According to some implementations, the control system may be configured to determine one or more first doublet pattern characteristics and to determine, based on at least one first doublet pattern characteristic, a first position of the target object on the surface, a first force of the target object on the surface and/or a first direction of movement of the target object relative to the surface.

In some examples, the first doublet pattern characteristics may include a first area radius, a second area radius, a first area centroid location, a second area centroid location and/or a direction from the first area centroid location to the second area centroid location. In some instances, the control system may be configured to determine, based on a shape of the first doublet pattern, a tilt angle of the target object relative to the surface.

According to some implementations, the control system may be may be configured to subtract at least a portion of a background image data set from the first image data. The background image data set may correspond to at least the portion of the piezoelectric receiver array.

In some instances, the piezoelectric receiver array may be, or may include, an ultrasonic receiver array. According to some implementations, the control system may be configured to provide fingerprint sensor functionality. Alternatively, or additionally, the control system may be configured to provide signature recognition functionality. The signature recognition functionality may involve detecting a current pattern of forces in each of a plurality of signature locations of a currently-detected signature and matching the current pattern of forces with a stored pattern of forces indicated by stored signature data of an authorized person.

According to some examples, the control system may be configured to determine the first direction of movement of the target object relative to the surface. The control system may be configured to select a scanning area of the piezoelectric receiver array based, at least in part, on the first direction of movement.

According to some implementations, the control system may be configured to acquire second image data from the piezoelectric receiver array. The second image data may correspond to a signal received from the piezoelectric receiver array during a second acquisition time window. The control system may be configured to detect a second doublet pattern in the second image data and to determine a second doublet pattern location. In some examples, the control system may be configured to determine a difference between the second doublet pattern location and a first doublet pattern location, and to determine, based on the difference, a velocity of the target object relative to the surface. In some examples, the control system may be configured to subtract at least a portion of the first image data from a corresponding portion of the second image data.

In some examples, the control system may be configured to determine one or more second doublet pattern characteristics. The control system may be configured to determine, based on at least one second doublet pattern characteristic, a second force of the target object on the surface and/or a second direction of movement of the target object relative to the surface.

According to some implementations, the control system may be configured to estimate the first force of the target object on the surface based, at least in part, on a first magnitude of one or more signals in the first area and/or a second magnitude of one or more signals in the second area. In some instances, the control system may be configured to estimate the first force of the target object on the surface based, at least in part, on a difference between the first magnitude and the second magnitude. According to some implementations, the control system may be configured to estimate the first force of the target object on the surface based, at least in part, at least one of a difference between the first magnitude and the threshold signal level or a difference between the second magnitude and the threshold signal level.

According to some examples, the control system may be configured to determine a first centroid of the first area and to determine a second centroid of the second area. The control system may be configured to determine a displacement between the first centroid and the second centroid. In some instances, the control system may be configured to estimate a velocity of the target object based, at least in part, on the displacement.

Still other innovative aspects of the subject matter described in this disclosure can be implemented in a method. In some examples, the method may involve determining information regarding one or more interactions between a target object and a display device.

For example, the method may involve acquiring first image data from at least a first portion of a piezoelectric receiver array. According to some implementations, the piezoelectric receiver array may be, or may include, an ultrasonic receiver array. The first image data may correspond to signals produced by at least the first portion of the piezoelectric receiver array in response to an acoustic signal and/or a mechanical deformation caused by a target object in contact with a surface proximate a second side of the display during a first acquisition time window.

In some examples, the method may involve detecting a first doublet pattern in the first image data. The first doublet pattern may include a first area of the piezoelectric receiver array from which signals below a threshold signal level have been received. The first doublet pattern may include a second area of the piezoelectric receiver array from which signals above the threshold signal level have been received. The first area may be adjacent to the second area.

According to some implementations, the method may involve determining one or more first doublet pattern characteristics. The method may involve determining, based on at least one first doublet pattern characteristic, a first position of the target object on the surface, a first force of the target object on the surface and/or a first direction of movement of the target object relative to the surface. In some examples, the first doublet pattern characteristics may include a first area radius, a second area radius, a first area centroid location, a second area centroid location and/or a direction from the first area centroid location to the second area centroid location.

In some instances, the method may involve subtracting at least a portion of a background image data set from the first image data. The background image data set may correspond to at least the portion of the piezoelectric receiver array.

In some examples, the method may involve determining the first direction of movement of the target object relative to the surface. The method may involve selecting a scanning area of the piezoelectric receiver array based, at least in part, on the first direction of movement.

According to some implementations, the method may involve acquiring second image data from the piezoelectric receiver array. The second image data may correspond to a signal received from the acoustic receiver array during a second acquisition time window. The method may involve detecting a second doublet pattern in the second image data and determining a second doublet pattern location. In some instances, the method may involve determining a difference between the second doublet pattern location and a first doublet pattern location. The method may involve determining, based on the difference, a velocity of the target object relative to the surface.

In some instances, the method may involve determining one or more second doublet pattern characteristics. The method may involve determining, based on at least one second doublet pattern characteristic, a second force of the target object on the surface and/or a second direction of movement of the target object relative to the surface. According to some implementations, the method may involve subtracting at least a portion of the first image data from a corresponding portion of the second image data.

Some or all of the operations, functions and/or methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

For example, the software may include instructions for controlling one or more devices to perform a method. In some examples, the method may involve determining information regarding one or more interactions between a target object and a display device.

For example, the method may involve acquiring first image data from at least a first portion of a piezoelectric receiver array. According to some implementations, the piezoelectric receiver array may be, or may include, an ultrasonic receiver array. The first image data may correspond to signals produced by at least the first portion of the piezoelectric receiver array in response to an acoustic signal and/or a mechanical deformation caused by a target object in contact with a surface proximate a second side of the display during a first acquisition time window.

In some examples, the method may involve detecting a first doublet pattern in the first image data. The first doublet pattern may include a first area of the piezoelectric receiver array from which signals below a threshold signal level have been received. The first doublet pattern may include a second area of the piezoelectric receiver array from which signals above the threshold signal level have been received. The first area may be adjacent to the second area.

According to some implementations, the method may involve determining one or more first doublet pattern characteristics. The method may involve determining, based on at least one first doublet pattern characteristic, a first position of the target object on the surface, a first force of the target object on the surface and/or a first direction of movement of the target object relative to the surface. In some examples, the first doublet pattern characteristics may include a first area radius, a second area radius, a first area centroid location, a second area centroid location and/or a direction from the first area centroid location to the second area centroid location.

In some instances, the method may involve subtracting at least a portion of a background image data set from the first image data. The background image data set may correspond to at least the portion of the piezoelectric receiver array.

In some examples, the method may involve determining the first direction of movement of the target object relative to the surface. The method may involve selecting a scanning area of the piezoelectric receiver array based, at least in part, on the first direction of movement.

According to some implementations, the method may involve acquiring second image data from the piezoelectric receiver array. The second image data may correspond to a signal received from the acoustic receiver array during a second acquisition time window. The method may involve detecting a second doublet pattern in the second image data and determining a second doublet pattern location. In some instances, the method may involve determining a difference between the second doublet pattern location and a first doublet pattern location. The method may involve determining, based on the difference, a velocity of the target object relative to the surface.

In some instances, the method may involve determining one or more second doublet pattern characteristics. The method may involve determining, based on at least one second doublet pattern characteristic, a second force of the target object on the surface and/or a second direction of movement of the target object relative to the surface. According to some implementations, the method may involve subtracting at least a portion of the first image data from a corresponding portion of the second image data.

Other innovative aspects of the subject matter described in this disclosure can be implemented in an apparatus. The apparatus may include a piezoelectric receiver array and a control system that is configured for communication with the piezoelectric receiver array. In some examples, at least a portion of the control system may be coupled to the piezoelectric receiver array. In some examples, the piezoelectric receiver array may be configured to be coupled to a first side of a display. In some implementations, a mobile device may be, or may include, the apparatus. For example, a mobile device may include an apparatus as disclosed herein.

According to some examples, the control system may be configured for acquiring image data from at least a first portion of the piezoelectric receiver array. The image data may correspond to signals produced by at least the first portion of the piezoelectric receiver array in response to an acoustic signal and/or a mechanical deformation caused by a target object in contact with a surface proximate a second side of the display during an acquisition time window.

In some examples, the control system may be configured for computing, based on the image data, a gradient field of signals in at least the first portion of the piezoelectric receiver array. In some examples, the control system may be configured for determining one or more gradient field characteristics and for determining, based on at least one gradient field characteristic, at least one of a position of the target object on the surface, a force of the target object on the surface or a direction of movement of the target object relative to the surface.

According to some implementations, the control system may be configured for determining a peak gradient magnitude of the gradient field. In some such implementations, the control system may be configured for determining the force of the target object on the surface and/or the direction of movement of the target object relative to the surface based, at least in part, on the peak gradient magnitude.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIG. 2 is a flow diagram that provides examples of operations according to some disclosed methods.

FIGS. 7A-7D show examples of doublet pattern shapes that correspond with stylus tilt angles.

FIGS. 9A-9F provide examples of the method of FIG. 8.

DETAILED DESCRIPTION

Figure 1:
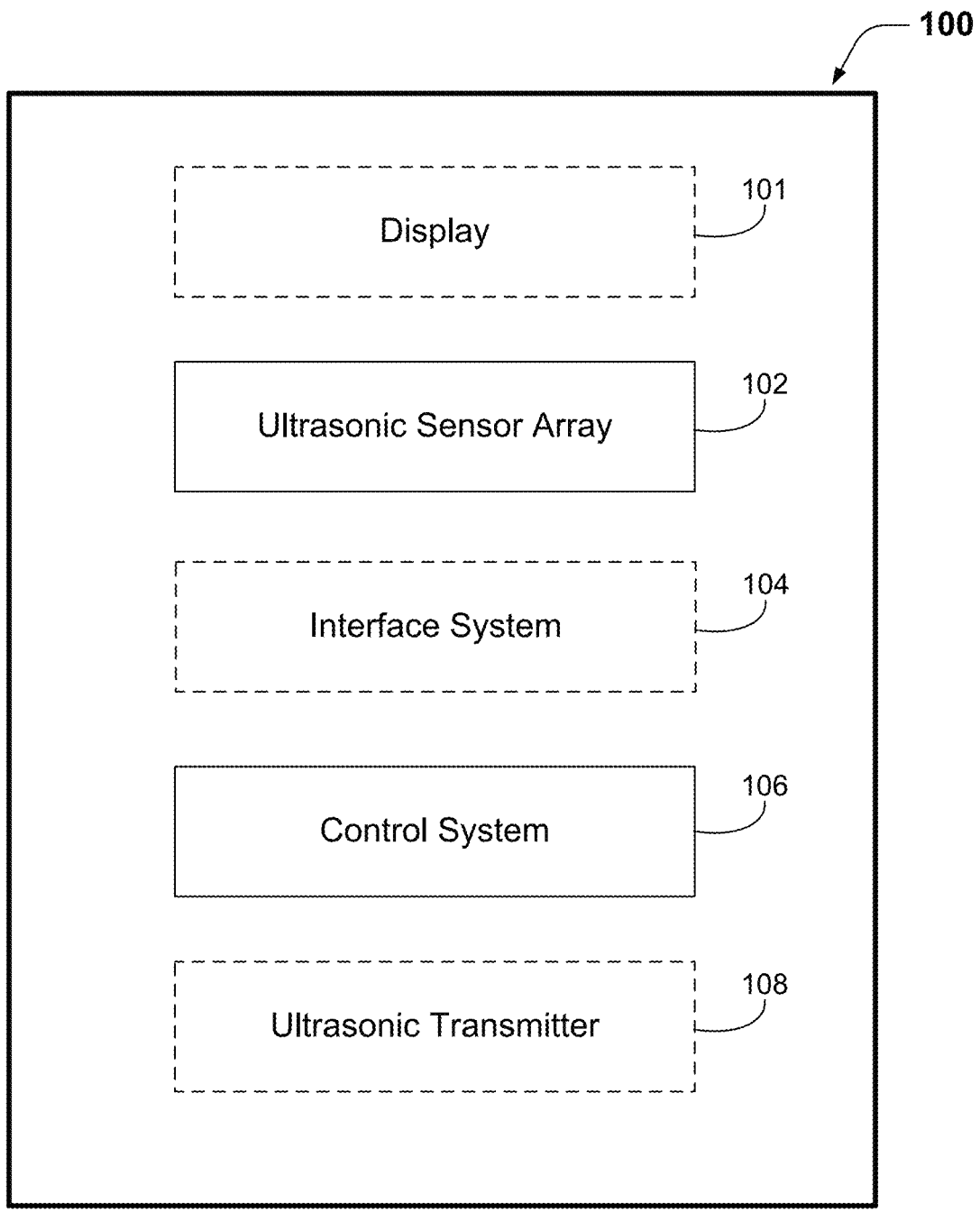
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Some disclosed stylus-tracking devices include a piezoelectric receiver or transceiver array on a first side (e.g., underneath) a display. The piezoelectric receiver array may include a piezoelectric layer. In some instances, the piezoelectric receiver array may be an ultrasonic receiver or transceiver array. A control system of a stylus-tracking device may be configured to acquire image data from at least a first portion of the piezoelectric receiver array. The image data may correspond to signals produced by the first portion of the acoustic receiver array in response to at least one of an acoustic signal or a mechanical deformation caused by a target object in contact with a surface, such as a cover glass, proximate a second side of the display. In some instances, the target object may be a stylus.

In some implementations, the control system may be configured to detect a doublet pattern in the image data. The doublet pattern may include a first area of the piezoelectric receiver array from which signals below a threshold signal level have been received and a second area of the piezoelectric receiver array from which signals above the threshold signal level have been received. The first area may be adjacent to the second area. The control system may be configured to determine, based on one or more doublet pattern characteristics, a position of the target object on the surface, a force of the target object on the surface and/or a first direction of movement of the target object relative to the surface.

According to some examples, the control system may be configured to compute, based on the image data, a gradient field of signals in at least the first portion of the piezoelectric receiver array. The control system may be configured to determine, based on one or more gradient field characteristics, a position of the target object on the surface, a force of the target object on the surface and/or a first direction of movement of the target object relative to the surface.

Particular implementations of the subject matter described in this disclosure may be implemented to realize one or more of the following potential advantages. Some stylus-tracking methods involve detecting signals or pressure disturbance generated by mechanical deformation created by stylus motion on a surface, via a piezoelectric receiver array, generated as a result of stylus motion on display surface. Such "passive" implementations can be very energy-efficient because it is not necessary to use an active transmitter, such as an ultrasonic transmitter, for stylus tracking. Some such implementations, such as those including a thin film transistor array and a piezoelectric copolymer, also may be relatively low-cost. Moreover, the stylus can be made of a variety of materials and therefore no special stylus is needed. For example, a standard ballpoint pen tip, fingernail or even fingertip can work as a stylus.

Further, the stylus does not need to have special electrical or magnetic characteristics or an embedded transducer. Some implementations of the stylus can also function under water or when the screen has water condensation on it, which can inhibit the function of a capacitive stylus. In addition to tracking stylus positions, some implementations are configured for determining the instantaneous direction of stylus movement and/or estimating the force exerted by the stylus on the contact surface, e.g., on the display's cover glass.

FIG. 1 is a block diagram that shows example components of an apparatus according to some disclosed implementations. In this implementation, the apparatus 100 includes a piezoelectric receiver array, which is an ultrasonic sensor array 102 in this example, and a control system 106. In alternative examples, the piezoelectric receiver array may operate in a range of frequencies that includes frequencies outside the ultrasonic range, such as frequencies within the range of human hearing. Moreover, in some examples the ultrasonic sensor array 102 may not be, or may not include, a piezoelectric receiver array. For example, the ultrasonic sensor array 102 may include a capacitive micromachined ultrasonic transducer (CMUT) array. Although not shown in FIG. 1, the apparatus 100 may include other components, such as a cover glass, a sensor substrate, etc. Some examples are described below. Some implementations of the apparatus 100 may include an interface system 104. In some examples, the apparatus 100 may include a display 101 and/or an ultrasonic transmitter 108. The piezoelectric receiver array (e.g., the ultrasonic sensor array 102) may, in some implementations, reside under the display 101.

Various examples of ultrasonic sensor arrays 102 are disclosed herein, some of which may include a separate ultrasonic transmitter and some of which may not. Although shown as separate elements in FIG. 1, in some implementations the ultrasonic sensor array 102 and the ultrasonic transmitter 108 may be combined in an ultrasonic transceiver. For example, in some implementations, the ultrasonic sensor array 102 may include a piezoelectric receiver layer, such as a layer of PVDF polymer or a layer of PVDF-TrFE copolymer. In some implementations, a separate piezoelectric layer may serve as the ultrasonic transmitter. In some implementations, a single piezoelectric layer may serve as the transmitter and as a receiver. In some implementations, other piezoelectric materials may be used in the piezoelectric layer, such as aluminum nitride (AlN) or lead zirconate titanate (PZT). The ultrasonic sensor array 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers. According to some alternative examples, the ultrasonic sensor array 102 may be an ultrasonic receiver array and the ultrasonic transmitter 108 may include one or more separate elements. In some such examples, the ultrasonic transmitter 108 may include an ultrasonic plane-wave generator, such as those described below.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 100 may have a memory system that includes one or more memory devices, though the memory system is not shown in FIG. 1. The control system 106 may be capable of receiving and processing data from the ultrasonic sensor array 102, e.g., as described below. If the apparatus 100 includes an ultrasonic transmitter 108, the control system 106 may be capable of controlling the ultrasonic transmitter 108, e.g., as disclosed elsewhere herein. In some implementations, functionality of the control system 106 may be partitioned between one or more controllers or processors, such as a dedicated sensor controller and an applications processor of a mobile device.

Some implementations of the apparatus 100 may include an interface system 104. In some examples, the interface system may include a wireless interface system. In some implementations, the interface system may include a user interface system, one or more network interfaces, one or more interfaces between the control system 106 and a memory system and/or one or more interfaces between the control system 106 and one or more external device interfaces (e.g., ports or applications processors).

The interface system 104 may be configured to provide communication (which may include wired or wireless communication, such as electrical communication, radio communication, etc.) between components of the apparatus 100. In some such examples, the interface system 104 may be configured to provide communication between the control system 106 and the ultrasonic sensor array 102. According to some such examples, a portion of the interface system 104 may couple at least a portion of the control system 106 to the ultrasonic sensor array 102, e.g., via electrically conducting material. If the apparatus 100 includes an ultrasonic transmitter 108 that is separate from the ultrasonic sensor array 102, the interface system 104 may be configured to provide communication between at least a portion of the control system 106 and the ultrasonic transmitter 108. According to some examples, the interface system 104 may be configured to provide communication between the system and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces). In some implementations, the apparatus 100 may include a memory system. The interface system 104 may, in some examples, include at least one interface between the control system 106 and a memory system.

The apparatus 100 may be used in a variety of different contexts, many examples of which are disclosed herein. For example, in some implementations a mobile device may include at least a portion of the apparatus 100. In some implementations, a wearable device may include at least a portion of the apparatus 100. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone or a tablet computer). The interface system 104 also may, in some such examples, reside in more than one device.

FIG. 2 is a flow diagram that provides examples of operations according to some disclosed methods. The blocks of FIG. 2 (and those of other flow diagrams provided herein) may, for example, be performed by the apparatus 100 of FIG. 1, by the apparatus 100 of FIG. 3A or by a similar apparatus. As with other methods disclosed herein, the method outlined in FIG. 2 may include more or fewer blocks than indicated. Moreover, the blocks of methods disclosed herein are not necessarily performed in the order indicated.

In this example, block 203 involves acquiring first image data from at least a first portion of a piezoelectric receiver array coupled to a first side of a display. The piezoelectric receiver array may, in some examples, include an ultrasonic sensor array such as the ultrasonic sensor array 102 of FIG. 1. The "first side" of the display may be an underside or interior portion of the display, opposite a second side on which a cover glass resides. Various examples of piezoelectric receiver arrays that reside under a display are disclosed herein.

The first image data may be acquired by at least a portion of a control system, such as the control system 106 of FIG. 1, in block 203. In some examples, the first image data may be received from the ultrasonic sensor array, whereas in other examples the first image data may be received from a memory device, such as a buffer. In this example, the first image data corresponds to signals received by at least the first portion of the piezoelectric receiver array in response to at least one of an acoustic signal or a mechanical deformation caused by a target object in contact with a surface proximate a second side of the display (e.g., a cover glass) during a first acquisition time window. In this instance, the first image data corresponds to at least one first reflected ultrasonic wave received by at least a portion of the ultrasonic sensor array from a target object during a first acquisition time window. The target object may, in some examples, be a stylus or a portion of a person's digit, such as a user's fingernail. Data received directly or indirectly from an ultrasonic sensor array may be referred to herein as "image data," although the image data will generally be received in the form of electrical signals. Accordingly, without additional processing such image data would not necessarily be perceivable by a human being as an image.

In some implementations, the method 200 may involve subtracting at least a portion of a background image data set from the first image data, the background image data set corresponding to at least the portion of the piezoelectric receiver array. Subtracting a corresponding portion of the background image data set from the first image data can improve the signal-to-noise ratio and can make subsequent processes more accurate and reliable.

According to this implementation, block 205 involves detecting a first doublet pattern in the first image data. Various examples of doublet patterns are illustrated in FIGS. 4A-8E and are described below. In this example, the first doublet pattern includes a first area of the piezoelectric receiver array from which signals below a threshold signal level have been received and a second area of the piezoelectric receiver array from which signals above the threshold signal level have been received. Here, the first area is adjacent to the second area.

In this example, block 207 involves determining one or more first doublet pattern characteristics. Various types of doublet pattern characteristics are shown and described herein. In some instances, the one or more doublet pattern characteristics may include a first area radius, a second area radius, a first area centroid location, a second area centroid location and/or a direction from the first area centroid location to the second area centroid location.

According to this implementation, block 209 involves determining, based on at least one first doublet pattern characteristic, a first position of the target object on the surface, a first force of the target object on the surface and/or a first direction of movement of the target object relative to the surface. In some examples, block 209 may involve estimating the first force of the target object on the surface based, at least in part, on a first magnitude of one or more signals in the first area and/or a second magnitude of one or more signals in the second area. The first and second magnitudes may, in some instances, be average magnitudes of the signals in the first and second areas, respectively. In some implementations, the first and second magnitudes may be the peak magnitudes of the signals (e.g., the signals having the highest absolute values) in the first and second areas, respectively.

In some such examples, block 209 may involve estimating the first force of the target object on the surface based, at least in part, on a difference between the first magnitude and the second magnitude. In some implementations, block 209 may involve estimating the first force of the target object on the surface based, at least in part, on a difference between the first magnitude and a reference magnitude (e.g., the threshold signal level) and/or on a difference between the second magnitude and the reference magnitude.

According to some examples, block 209 may involve determining a first centroid of the first area and determining a second centroid of the second area. Block 209 may involve determining a displacement between the first centroid and the second centroid and estimating a direction of movement and/or a velocity of the target object based, at least in part, on the displacement.

Accordingly, method 200 may involve determining a direction of movement of the target object at a particular time, which may be referred to herein as an instantaneous direction of movement of the target object. Information regarding the direction of movement of the target object may advantageously be used for determining which portions of the piezoelectric receiver array will or will not be scanned within a time interval after determining the instantaneous direction of movement of the target object. The time interval may, in some instances, be on the order of milliseconds, e.g., 50 milliseconds, 100 milliseconds, 150 milliseconds, 200 milliseconds, 250 milliseconds, etc. Some such implementations may involve determining a first direction of movement of the target object relative to the surface and selecting a scanning area of the piezoelectric receiver array based at least in part on the first direction of movement.

Some implementations of method 200 may involve tracking multiple positions of the target object. According to some such implementations, the control system of an apparatus (such as the apparatus 100 of FIG. 1) may be configured to acquire second image data from the piezoelectric receiver array. The second image data may correspond to a signal produced by the piezoelectric receiver array in response to at least one of an acoustic signal or a mechanical deformation caused by the target object during a second acquisition time window. The control system may be configured to detect a second doublet pattern in the second image data, to determine a second doublet pattern location, to determine a difference between the second doublet pattern location and a first doublet pattern location and to determine, based on the difference, a velocity of the target object relative to the surface. The control system may be configured to determine a second position of the target object based on the second image data.

In some such examples, the control system may be configured to determine one or more second doublet pattern characteristics. The control system may be configured to determine, based on at least one second doublet pattern characteristic, a second position of the target object, a second force of the target object on the surface and/or a second direction of movement of the target object relative to the surface.

According to some such examples, the control system may be configured to subtract at least a portion of the first image data from a corresponding portion of the second image data. Subtract a portion of the first image data from a corresponding portion of the second image data can facilitate a process of determining changes between the first image data and the second image data.

In some such implementations, an apparatus may be configured for tracking multiple positions of the target object in order to receive user input. According to some such implementations, an apparatus may be configured for tracking multiple positions of the target object to receive input for a text recognition process and/or an image recognition process. In some such implementations, a control system of the apparatus may be configured to provide signature recognition functionality.

According to some such implementations, the signature recognition functionality may involve detecting a current pattern of forces in each of a plurality of signature locations of a currently-detected signature and matching the current pattern of forces with a stored pattern of forces indicated by stored signature data of an authorized person. The stored pattern of forces may have been acquired during a registration process for the authorized person. The registration process may have involved using other biometric functionality of the apparatus, such as fingerprint recognition functionality, to obtain biometric data for authenticating the authorized person. According to some such implementations, the control system 106 of FIG. 1 may be configured to provide fingerprint sensor functionality and fingerprint authentication functionality, based on signals received by the ultrasonic sensor array. In some such examples, the apparatus 100 may include the optional ultrasonic transmitter 108, or the ultrasonic sensor array 102 may be configured as an ultrasonic transceiver array.

In some implementations, the doublet pattern characteristics may include a shape of a doublet pattern, which may include the shape of the first area and/or the shape of the second area. According to some such implementations, method 200 may involve estimating a tilt angle of the target object (e.g., the tilt angle of a stylus), based at least in part on the shape of a doublet pattern. Some examples are described below with reference to FIGS. 7A-8E.

Figure 3A:
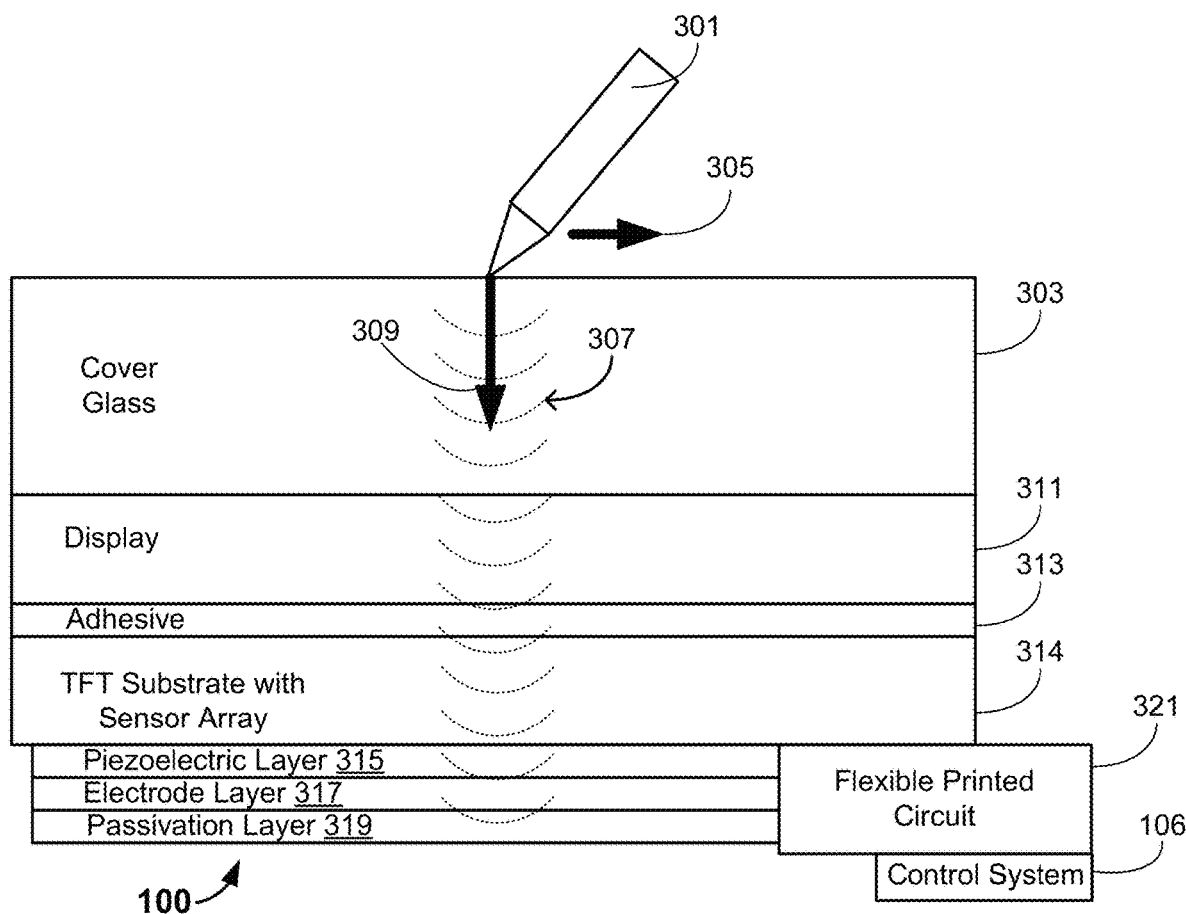
FIG. 3A provides an example of an apparatus configured to perform at least some methods disclosed herein.

FIG. 3A provides an example of an apparatus configured to perform at least some methods disclosed herein. The apparatus 100 may, for example, be configured to perform the method 200, described above with reference to FIG. 2, and/or the method 900 that is described below with reference to FIG. 9. As with other disclosed implementations, the numbers, types and arrangements of elements shown in FIG. 3A are merely presented by way of example. In the example shown in FIG. 3A, a stylus 301 is in contact with a cover glass 303 of the apparatus 100. In this example, the stylus 301 is moving in the direction indicated by the arrow 305. Here, acoustic waves 307 generated by the interaction of the stylus 301 with the cover glass 303 propagate in the direction of the arrow 309, as well as in other directions. In some examples, the apparatus may detect a mechanical deformation caused by the stylus 301 instead of, or in addition to, detecting an acoustic wave caused by the stylus 301.

According to this example, a display 311 underlies the cover class 303. The display 311 may, for example, correspond with the display 101 of FIG. 1. In some examples the display 311 may be, or may include, a light-emitting diode (LED) display, such as an organic light-emitting diode (OLED) display.

Here, the apparatus 100 is disposed below a portion of the display 311. In alternative examples, the apparatus 100 may be disposed below a larger portion of the display 311, or below the entire visible extent of the display 311. In this example, the apparatus 100 includes a thin-film transistor (TFT) substrate 314 that includes a piezoelectric receiver array, which is an ultrasonic sensor array in this instance. According to this example, an adhesive layer 313 couples the TFT substrate 314 to the display 311. In the example shown in FIG. 3A, a piezoelectric layer 315 is coupled to the TFT substrate 314. The piezoelectric layer 315 may include one or more ferroelectric polymers such as polyvinylidene fluoride (PVDF) or polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Alternatively, or additionally, the piezoelectric layer 315 may include one or more other piezoelectric materials such as polyvinylidene chloride (PVDC) homopolymers or copolymers, polytetrafluoroethylene (PTFE) homopolymers or copolymers, diisopropylammonium bromide (DIPAB), aluminum nitride (AlN) and/or lead zirconate titanate (PZT).

According to this example, the apparatus 100 includes an electrode layer 317 adjacent to the piezoelectric layer 315 and a passivation layer 319 adjacent to the electrode layer 317. In this instance, at least a portion of the control system 106 is configured for electrical communication with the electrode layer 317, the piezoelectric layer 315 and the TFT substrate 314 via a flexible printed circuit 321.

Figure 3B:
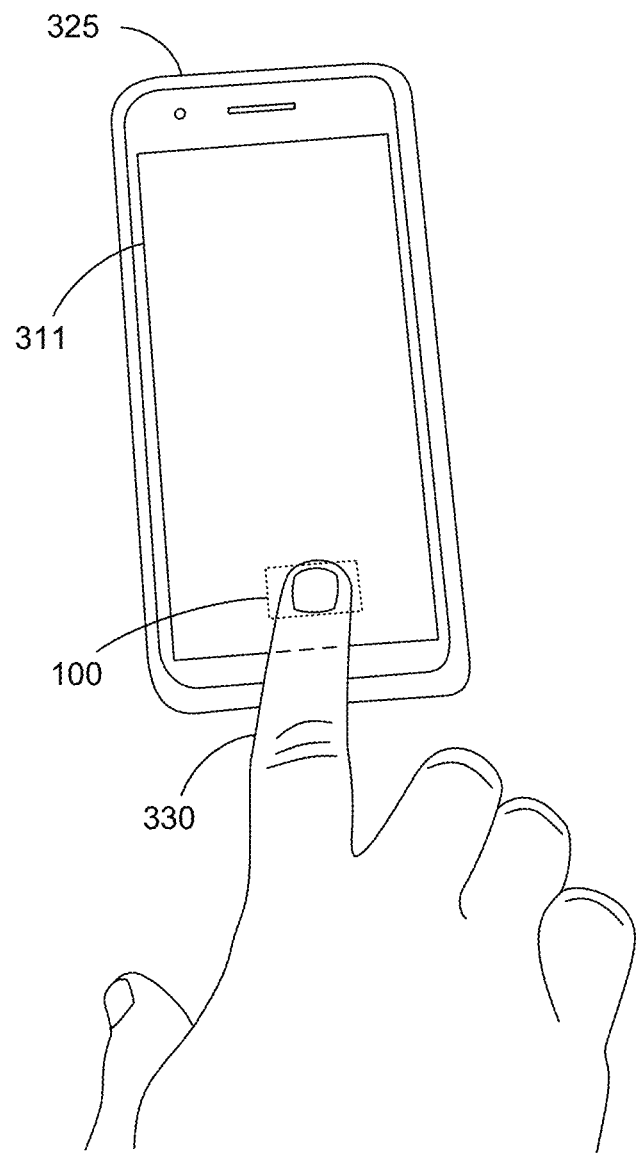
FIG. 3B shows an example of a display device that includes the apparatus shown in FIG. 1.

FIG. 3B shows an example of a display device that includes the apparatus shown in FIG. 1. In this example, the display device 325 is a cellular telephone that includes the apparatus 100. Here, the apparatus 100 is disposed below a portion of the display 311. In alternative examples, the apparatus 100 may be disposed below a larger portion of the display 311, or below the entire visible extent of the display 311. According to this example, the target object is a finger 330. In some such implementations, the apparatus 100 is configured to perform the methods 200 and 900 disclosed herein. In some implementations, the apparatus 100 may be configured to perform fingerprint sensor functionality, such as fingerprint authentication functionality.

FIGS. 4A-7D include examples of images acquired by an ultrasonic sensor array as disclosed herein. In these example, the images have been obtained by an ultrasonic sensor array disposed proximate a first side of a display (e.g., below the display) and correspond to images acquired by the ultrasonic sensor array in response to a target object on a second side of the display.

Figure 4A:
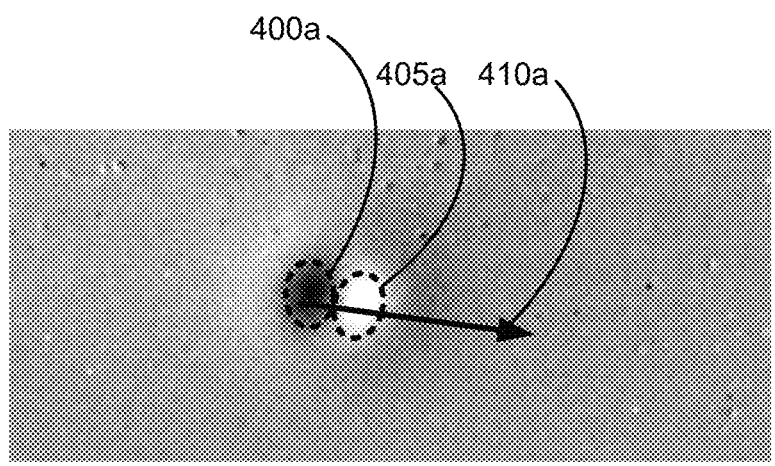
FIGS. 4A-4C show examples of doublet pattern characteristics.
Figure 4B:
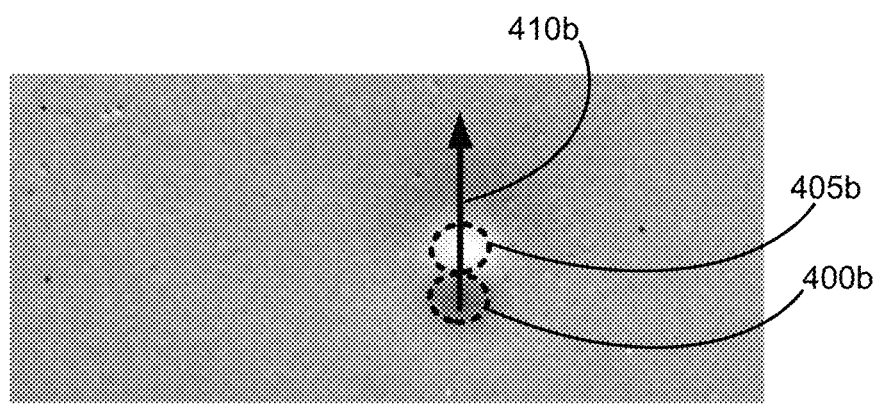
Figure 4C:
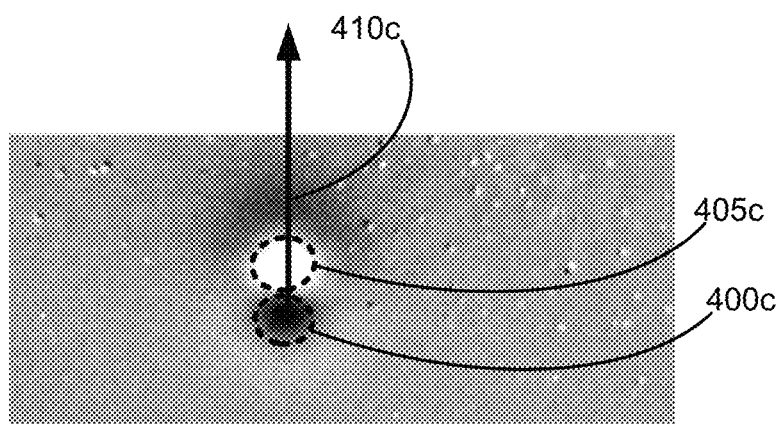

FIGS. 4A-4C show examples of doublet pattern characteristics. Areas 400a-400c are examples of the "first area" of the piezoelectric receiver array that is described above with reference to block 203 of FIG. 2, from which signals below a threshold signal level have been received. The areas 400a-400c are shown in darker shades than the grey tones of the background, the darker shades corresponding with the signals below the threshold signal level. The level of darkness, or blackness, indicates the extent to which the signals are below the threshold signal level.

Areas 405a-405c are examples of the "second area" of the piezoelectric receiver array that is described above with reference to block 203 of FIG. 2, from which signals above a threshold signal level have been received. The areas 405a-405c are shown in lighter shades than the grey tones of the background, the lighter shades corresponding with the signals below the threshold signal level. The level of lightness, or whiteness, indicates the extent to which the signals are above the threshold signal level.

For example, it may be observed that areas 400a and 400c are relatively darker than area 400b. Similarly, it may be observed that areas 405a and 405c are relatively whiter than most of area 405b, except possibly the central portion of area 405b. These differences in shade correspond to differences in signal level and also may correspond to differences in the force applied by the target object to the display, or to a cover glass over the display. The size of the areas 400a-400c and the areas 405a-405c also may correspond to the force applied by the target object to the display, or to the cover glass over the display.

In the examples shown in FIGS. 4A-4C, the directions of movement of the target objects are shown by the arrows 410a-410c. In these examples, the directions of movement have been determined according to the displacement of centroids of the areas. For example, in FIG. 4A, the arrow 410a indicates the trajectory of the displacement from the centroid of the area 400a to the centroid of the area 405a.

Figure 5A:
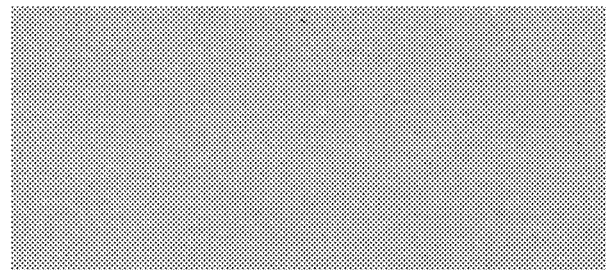
FIGS. 5A-5C show examples of images before, during and after a target object is in contact with an apparatus.
Figure 5B:
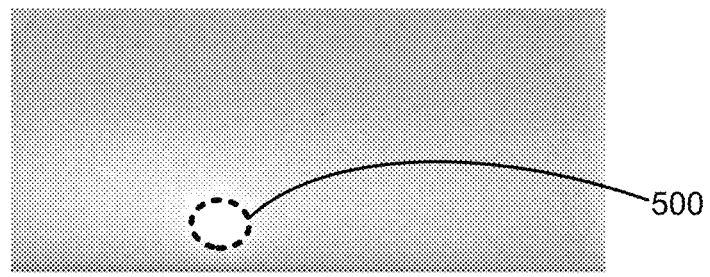
Figure 5C:
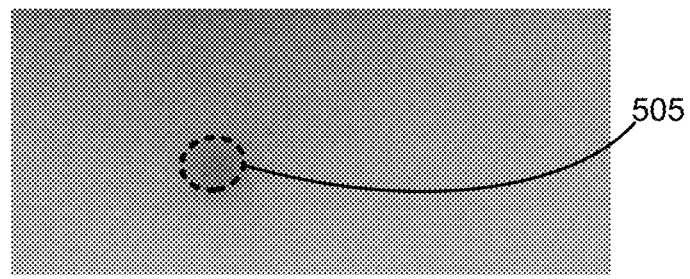

FIGS. 5A-5C show examples of images before, during and after a target object is in contact with an apparatus. FIG. 5A shows a "background" image at a time during which no target object was touching the apparatus 100. At the time depicted by FIG. 5B, a stylus is pressing on a cover glass of the apparatus, in the area 500. At the time depicted by FIG. 5C, a stylus that was pressing the cover glass in the area 505 has been lifted. The process of lifting the stylus causes the dark shading in the area 505.

Figure 6A:
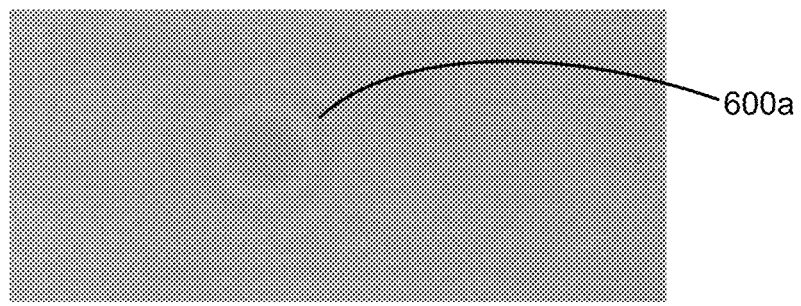
FIGS. 6A and 6B show examples of active methods of locating and/or tracking a target object, such as a stylus.
Figure 6B:
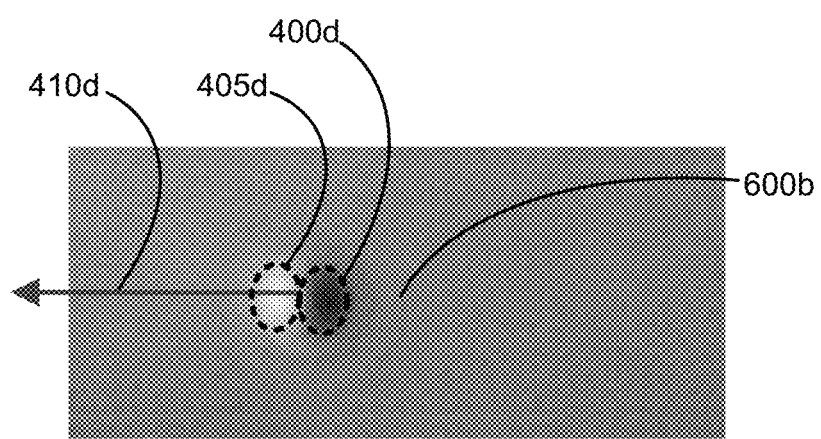

FIGS. 6A and 6B show examples of active methods of locating and/or tracking a target object, such as a stylus. In the example shown in FIG. 6A, ultrasonic waves transmitted by a transmitter or a transceiver (e.g., by the ultrasonic transmitter 108 or the ultrasonic sensor array 102 shown in FIG. 1) have been diffracted from a stationary stylus tip, producing the rings 600a. In the example shown in FIG. 6B, the stylus is moving in the direction shown by arrow 410d. The motion of the stylus may be detected according to the doublet pattern characteristics of the areas 400d and 405d, as well as by the location of the center of the rings 600b.

FIGS. 7A-8E show examples of doublet pattern shapes that correspond with stylus tilt angles and stylus angular motion. The mechanical deformation caused by a stylus as it moves on a surface will change because of stylus angular motion and therefore will create a corresponding pattern on a piezoelectric receiver. Thus, it is possible to estimate stylus tilt angle based on a doublet pattern shape. Referring first to FIGS. 7A-7D, it may be observed that a tilt of the stylus 301 may be inferred by the fact that the areas 400e-400h and the areas 405e-405h are oval instead of round. The degree of tilt of the stylus 301 corresponds with an extent to which the areas 400e-400h and the areas 405e-405h are "extended" from circular shapes, e.g., the distance between the foci of the elliptical shapes. One can also see that the lines 700a-700d, which are defined by the areas 400-e-400h and the areas 405e-405h, roughly correspond with a plane in which the stylus 301 is tilted. This is particularly applicable to a stylus with a well-designed known tip shape. In some implementations, the doublet patterns may be calibrated prior to product release according to the tilt angle of a particular stylus and/or the angular motion of the stylus. In other cases, a user may be asked to perform a training process during which a stylus (which may be a user-selected stylus) is dragged with different angles to calibrate the stylus tilt by recording corresponding image patterns. Accordingly, some implementations may involve a training or calibration process that involves receiving and storing doublet pattern shapes corresponding to various angular motions and/or tilt angles of a particular type of stylus, when used with a particular display device and a particular piezoelectric receiver array. During use of the display device, a database of doublet pattern shapes may be queried to estimate an angular motion of the stylus and/or a tilt angle of the stylus corresponding to currently-received gradient field data corresponding to the stylus.

Figure 8:
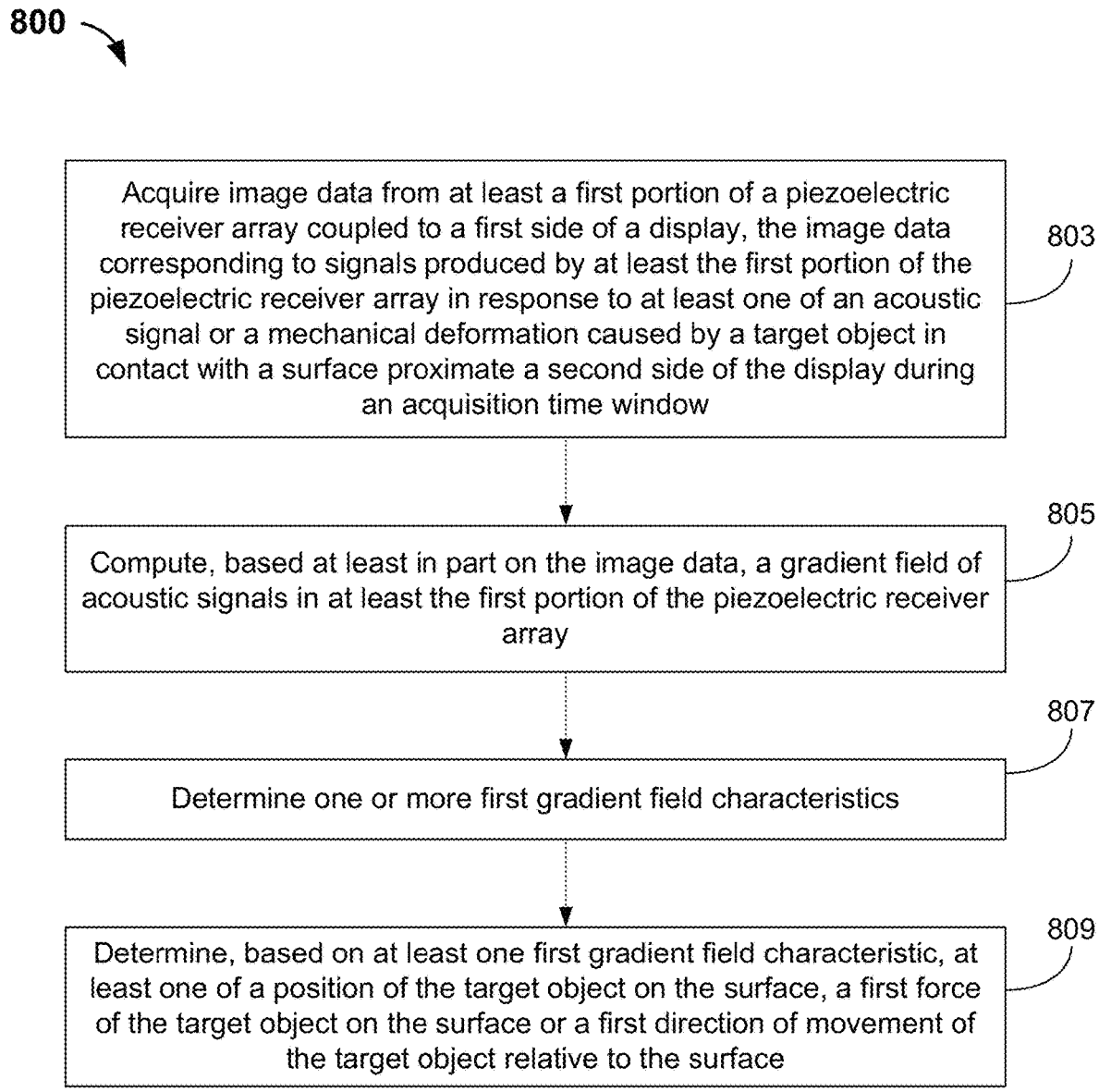
FIG. 8 is a flow diagram that provides examples of operations according to some alternative methods.

FIG. 8 is a flow diagram that provides examples of operations according to some alternative methods. The blocks of FIG. 8 (and those of other flow diagrams provided herein) may, for example, be performed by the apparatus 100 of FIG. 1, by the apparatus 100 of FIG. 3A or by a similar apparatus. As with other methods disclosed herein, the method outlined in FIG. 8 may include more or fewer blocks than indicated. Moreover, the blocks of methods disclosed herein are not necessarily performed in the order indicated.

In this example, block 803 involves acquiring image data from at least a first portion of a piezoelectric receiver array coupled to a first side of a display. The "first side" of the display may be an underside or interior portion of the display, opposite a second side on which a cover glass resides. The piezoelectric receiver array may, in some examples, include an ultrasonic sensor array such as the ultrasonic sensor array 102 of FIG. 1. The image data may be acquired by at least a portion of a control system, such as the control system 106 of FIG. 1, in block 803. In some examples, the image data may be received from the ultrasonic sensor array, whereas in other examples the image data may be received from a memory device, such as a buffer. In this example, the image data corresponds to signals received by at least the portion of the piezoelectric receiver array from a target object in contact with a surface proximate a second side of the display (e.g., a cover glass) during an acquisition time window. In this instance, the image data corresponds to at least one reflected ultrasonic wave received by at least a portion of the ultrasonic sensor array from a target object during an acquisition time window. The target object may, in some examples, be a stylus or a portion of a person's digit, such as a user's fingernail.

In the example shown in FIG. 8, block 805 involves computing, based at least in part on the image data, a gradient field of signals in at least the first portion of the piezoelectric receiver array. Here, block 807 involves determining one or more first gradient field characteristics. According to this example, block 809 involves determining, based on at least one first gradient field characteristic, a position of the target object on the surface, a first force of the target object on the surface and/or a first direction of movement of the target object relative to the surface.

FIGS. 9A-9F provide examples of the method of FIG. 8. FIG. 9A provides an example of image data received from a piezoelectric receiver array after a process of subtracting a background image. The "background image" may, for example, correspond to image data at a time during which no target object is being detected.

In these examples, the areas 900a shown in FIGS. 9A-9C correspond to the "first area of the piezoelectric receiver array from which signals below a threshold signal level have been received" that has been described above. According to these examples, the areas 905a shown in FIGS. 9A-9C correspond to the "second area of the piezoelectric receiver array from which signals above the threshold signal level have been received" that is described above. The three-dimensional view of FIG. 9B clearly shows that the areas 905a correspond to signals that are above a threshold signal level and that the areas 900a correspond to signals that are below the threshold signal level.

FIG. 9C provides an enlarged two-dimensional view of the areas 900a and 905a. As described above, the direction of motion of the stylus may be determined according to the displacement from the centroid or peak signal value of the area 900a to the centroid or peak signal value of the area 905a.

FIG. 9D shows the gradient field that corresponds with the image data of FIG. 9A. FIG. 9E is an enlarged view of a portion of FIG. 9D that includes the areas 910a and 915a. By comparing FIG. 9A with FIG. 9D, or by comparing FIG. 9C with FIG. 9E, one can see that the areas 910a and 915a correspond with the areas 900a and 905a, respectively. The gradient field indicates the greatest slope for each point of the graph, as well as the direction of the greatest slope. Accordingly, the gradient field is a vector field.

FIGS. 9E and 9F indicate the position 920a of the peak or maximum gradient magnitude. According to some implementations, the target object position is estimated to be the position corresponding to the maximum gradient magnitude, which is position 920a in this example. It may be observed that the position of the maximum gradient magnitude is generally midway between the centroids of the areas 900a and 905a. In some examples, the direction of the gradient field at the position of the maximum gradient magnitude (the target object position) is estimated to be the direction of target object motion.

Moreover, the inventors have observed that when the contact force increases, the areas 900a and 905a become darker and brighter, respectively, indicating that the corresponding signals have increased amplitudes. Such increases in force cause a greater gradient magnitude at the target object position. Therefore, the gradient magnitude can represent the magnitude of contact force of the target object on a surface of the apparatus 100, e.g., the magnitude of contact force of the target object on a cover glass of a display. Similarly, as described above with reference to FIG. 7A et seq., the inventors have found that the gradient field changes in response to angular motion of the stylus. Therefore, an angular motion of the stylus, as well as a tilt angle of the stylus, may be determined via evaluation of the gradient field in the vicinity of a stylus location. Some implementations involve a "training" process that involves receiving and storing gradient field data corresponding to various angular motions and tilt angles of a particular type of stylus, when used with a particular display device and a particular piezoelectric receiver array. During use of the display device, a database of gradient field data may be queried to estimate an angular motion of the stylus and/or a tilt angle of the stylus corresponding to currently-received gradient field data corresponding to the stylus.

FIGS. 10A-10F show cross-sectional schematic views of various example ultrasonic sensor systems in a "receiver down" orientation according to some implementations. In the "receiver down" orientation, a piezoelectric transceiver layer is underlying a sensor substrate so that the sensor substrate is in the acoustic path. An FPC may be coupled to the sensor substrate so that the FPC is underlying the sensor substrate in the "receiver down" orientation.

In FIGS. 10A-10F, each of the ultrasonic fingerprint sensor systems 1000 includes a sensor substrate 1030, a piezoelectric transceiver layer 1040, a transceiver electrode layer 1045, a passivation layer 1050 (except in FIG. 10F), and an FPC 1020 coupled to the sensor substrate 1030. The piezoelectric transceiver layer 1040 may include a piezoelectric material configured to transmit ultrasonic waves upon the application of a voltage. Examples of a suitable piezoelectric material include PVDF or PVDF-TrFE copolymers. In some implementations, the piezoelectric material is configured to receive ultrasonic waves and generate a surface charge that is provided to sensor pixel circuits disposed in or on the sensor substrate 1030. The sensor substrate 1030 may include a plurality of sensor pixel circuits 1035 such as a TFT array of sensor pixel circuits. The sensor pixel circuits 1035 on the sensor substrate 1030 may amplify or buffer the generated surface charge to provide electrical output signals to the FPC 1020 or control system (not shown). The ultrasonic fingerprint sensor system 1000 in the "receiver down" orientation includes a transceiver electrode layer 1045 underlying the piezoelectric transceiver layer 1040 and coupled to the piezoelectric transceiver layer 1040. In some implementations, the transceiver electrode layer 1045 may include a metallized electrode that may be grounded or biased to control which signals may be generated and which reflected signals may be passed to the plurality of sensor pixel circuits 1035 disposed on the sensor substrate 1030. The ultrasonic fingerprint sensor system 1000 in the "receiver down" orientation may include a passivation layer 1050 underlying the transceiver electrode layer 1045 or at least portions of the transceiver electrode layer 1045. The passivation layer 1050 may include one or more layers of electrically insulating material, such as silicon nitride, silicon dioxide, benzocyclobutene (BCB), polyimide, a thermosetting material such as a thermosetting epoxy, a UV-curable resin, an acrylic, an epoxy, or other suitable material to provide protection for underlying electrodes, the piezoelectric transceiver layer 1040, interconnects, electrical traces, electrical and electronic components, and electronic circuits. The thickness of the passivation layer 1050 may be selected to maximize the efficiency of the ultrasonic fingerprint sensor system 1000. In some implementations, the passivation layer 1050 may be printed, sprayed or laminated onto an outer portion of the transceiver electrode layer 1045.

In each of the ultrasonic fingerprint sensor systems in FIGS. 10A-10F, a mechanical stress isolation layer 1010 may be disposed over the sensor substrate 1030 in the "receiver down" orientation.

In each of the ultrasonic fingerprint sensor systems 1000 in FIGS. 10A-10D, the mechanical stress isolation layer 1010 is positioned between two adhesive layers 1005, 1025. In some implementations, a first adhesive layer 1005 positioned between the mechanical stress isolation layer 1010 and a display (not shown) may include a pressure-sensitive adhesive. In some implementations, a second adhesive layer 1025 between the mechanical stress isolation layer 1010 and the sensor substrate 1030 may include a structural adhesive, such as a thermally curable epoxy. An edge seal 1015 may be provided on the mechanical stress isolation layer 1010 and around the sides of the ultrasonic fingerprint sensor system 1000 and in some implementations on the back side to seal and protect the ultrasonic fingerprint sensor system 1000 as a package. The edge seal 1015 may serve to protect the ultrasonic fingerprint sensor system 1000 against the ambient environment, moisture ingress and external forces. In some implementations, the edge seal 1015 may include a thermally curable epoxy. The mechanical stress isolation layer 1010 enables the edge seal 1015 so that the edge seal 1015 is not directly attached or bonded to the display, which could otherwise result in stresses and distortions being imparted to the display.

Figure 10A:
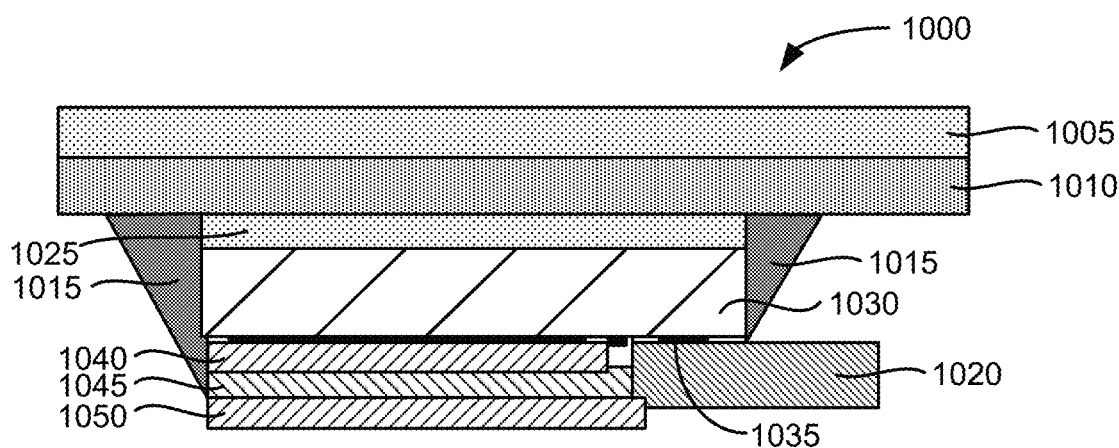
FIGS. 10A-10F show cross-sectional schematic views of various example ultrasonic sensor systems in a "receiver down" orientation according to some implementations.
Figure 10B:
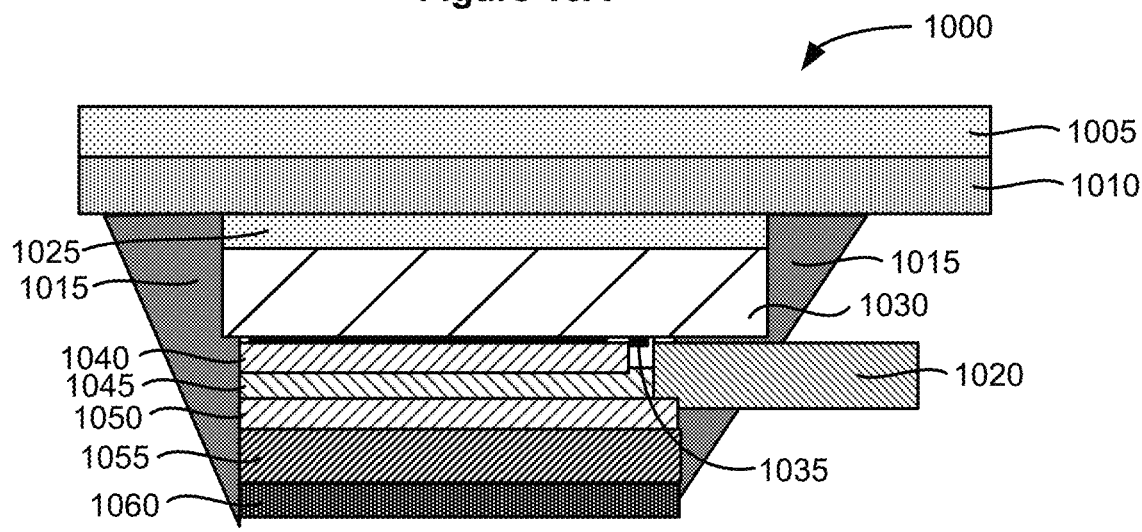

FIG. 10A as shown does not include additional backing layers or structures underlying the passivation layer 1050 of the ultrasonic fingerprint sensor system 1000. In this configuration, air serves as an effective backing layer. However, air backing layers may provide insufficient protection against inadvertent contact with other components, which may result in interference with the ultrasonic imaging and potential mechanical damage to the sensor system 1000. In FIG. 10B, the ultrasonic fingerprint sensor system further includes a foam backing layer 1055 (also referred to as a "foam backer" or "foam layer") and a stiffener 1060 underlying the foam backing layer 1055 relative to the ultrasonic fingerprint sensor system 1000 of FIG. 10A. In some implementations, the ultrasonic fingerprint sensor system 1000 includes a stiffener 1060 and an electrical shield underlying the foam backing layer 1055. The stiffener 1060, which may be a stamped layer of stainless steel or aluminum in some implementations, may be electrically grounded to provide an effective electrical shield.

The foam backing layer 1055 may have an acoustic impedance very close to air and substantially lower than the piezoelectric transceiver layer 1040 such that acoustic wave transmission into the foam backing layer 1055 and subsequent layers is significantly reduced. The foam backing layer 1055 may have an acoustic impedance substantially different than the piezoelectric transceiver layer 1040. The acoustic impedance mismatch between the foam backing layer 1055 and the piezoelectric transceiver layer 1040 are substantially different. The term "substantially different" with respect to acoustic impedance throughout this disclosure refers to an acoustic impedance value that is at least five times, at least eight times, at least ten times, or at least 100 times greater or less than an acoustic impedance value being compared to. That way, the foam backing layer 1055 can provide total or near-total reflection of propagating ultrasonic waves. In addition, the foam backing layer 1055 may provide a mechanical support and cushion for protecting the ultrasonic fingerprint sensor system 1000. When external forces are applied to the ultrasonic fingerprint sensor system 1000 from other components or objects touching the back side of the sensor, acoustic energy may be lost unless a foam backing layer or other protection (e.g., a sensor housing and an air cavity) is provided. Details regarding the foam backing layer 1055 are discussed further with respect to FIGS. 13A-13B.

In FIG. 10B, the stiffener 1060 may serve as a cap and may be coupled to the back side of the ultrasonic fingerprint sensor system 1000. In some implementations, the stiffener 1000 may comprise a wafer, substrate, panel, sub-panel, or one or more layers of plastic, metal, glass, or silicon. In some implementations, the stiffener 1060 may have a high flexural modulus and mechanical strength to structurally and environmentally protect the ultrasonic fingerprint sensing system 1000. The foam backing layer 1055 and the stiffener 1060 may combine to provide the ability to seal the sensor system 1000 from external moisture and to improve moisture protection for higher reliability. In some implementations, an air backing layer may be combined with the foam backing layer 1055 and positioned between the transceiver electrode layer 1045 and the stiffener 1060 to provide additional acoustic isolation.

Figure 10C:
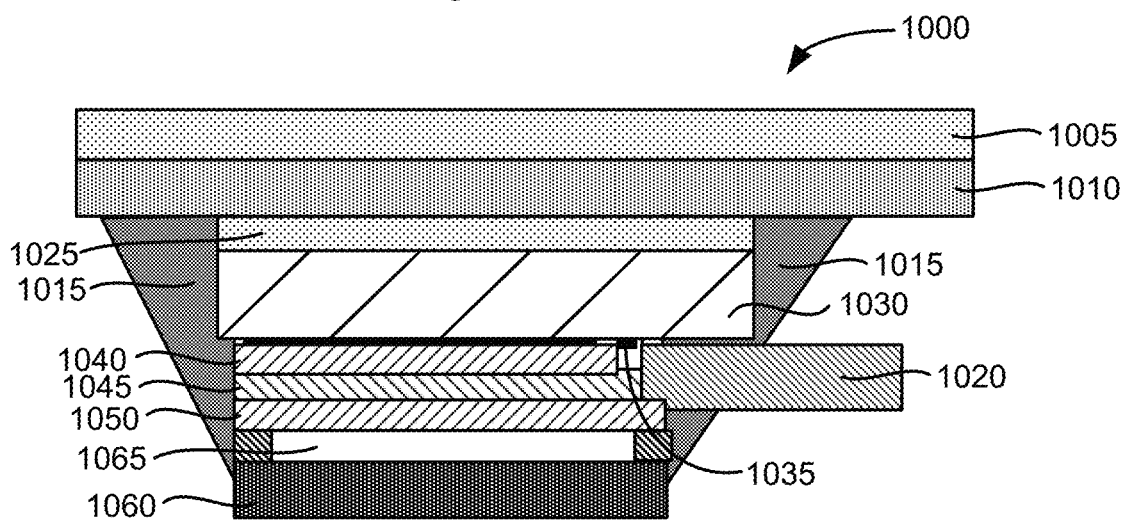

In FIG. 10C, the ultrasonic fingerprint sensor system 1000 further includes a stiffener 1060 and a cavity 1065 relative to the ultrasonic fingerprint sensor system 1000 of FIG. 10A. The cavity 1065 may be an air gap defined between the stiffener 1060 and the passivation layer 1050 of the ultrasonic fingerprint sensor system 1000. One or more spacers may be used to control the gap height or height of the cavity 1065. The cavity 1065 forms an air backing layer that may provide a substantial acoustic impedance mismatch with the piezoelectric transceiver layer 1040, transceiver electrode layer 1045, and passivation layer 1050 so that the cavity 1065 can provide total or near-total reflection of propagating ultrasonic waves. An electrical shield may be further provided on the back side of the ultrasonic fingerprint sensor system 1000 along with the stiffener 1060. In some implementations, the stiffener 1060 may be electrically grounded and serve as an electrical shield.

Figure 10D:
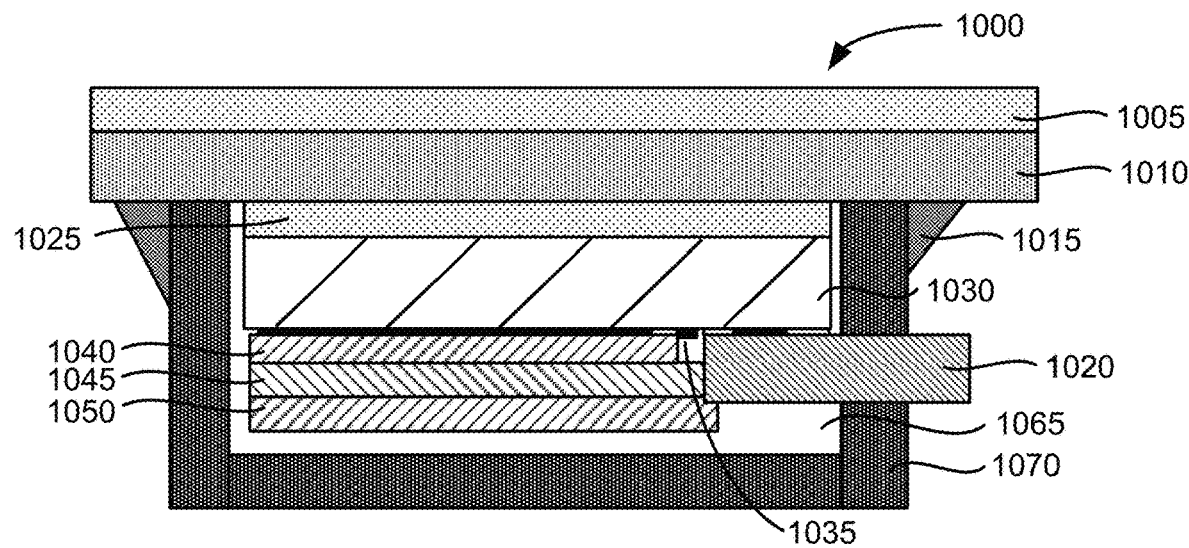

In FIG. 10D, the ultrasonic fingerprint sensor system 1000 further includes a sensor housing 1070 and a cavity 1065 relative to the ultrasonic fingerprint sensor system 1000 of FIG. 10A. The cavity 1065 forms an air gap or air backing layer (also referred to as an "air backer") between the sensor housing 1070 and at least the passivation layer 1050 of the ultrasonic fingerprint sensor system 1000. In some implementations, the sensor housing 1070 includes one or more layers of plastic or metal. The sensor housing 1070 may be disposed on the mechanical stress isolation layer 1010 to provide encapsulation of the ultrasonic fingerprint sensor system 1000. An electrical shield may be provided on the back side of the ultrasonic fingerprint sensor system 1000 along with the sensor housing 1070. As described with respect to FIG. 10C, a stiffener may be electrically grounded and serve as an electrical shield. The stiffener may be included as part of the sensor housing 1070 or on the sensor housing 1070.

Figure 10E:
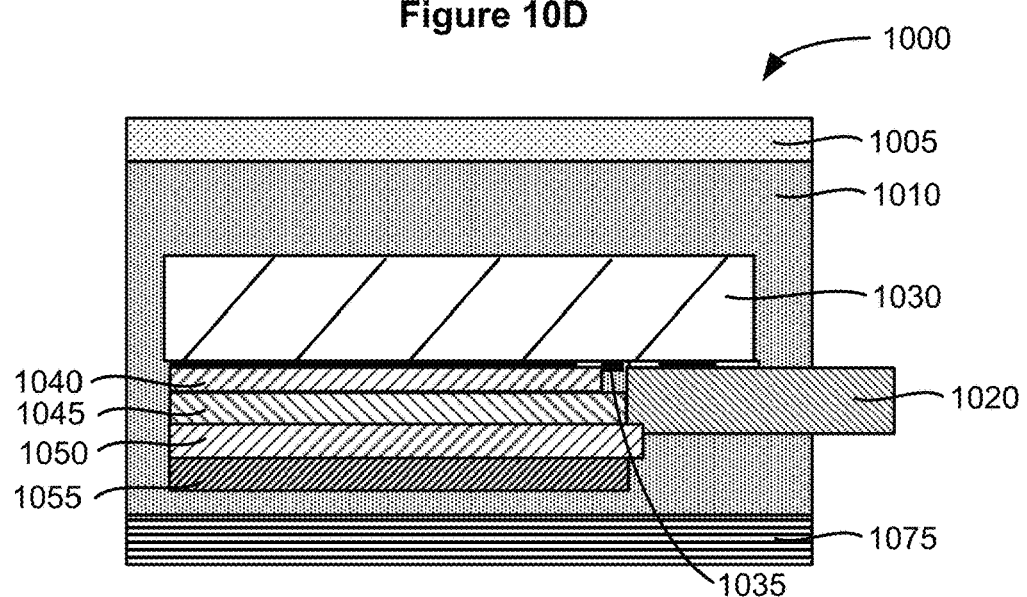
Figure 10F:
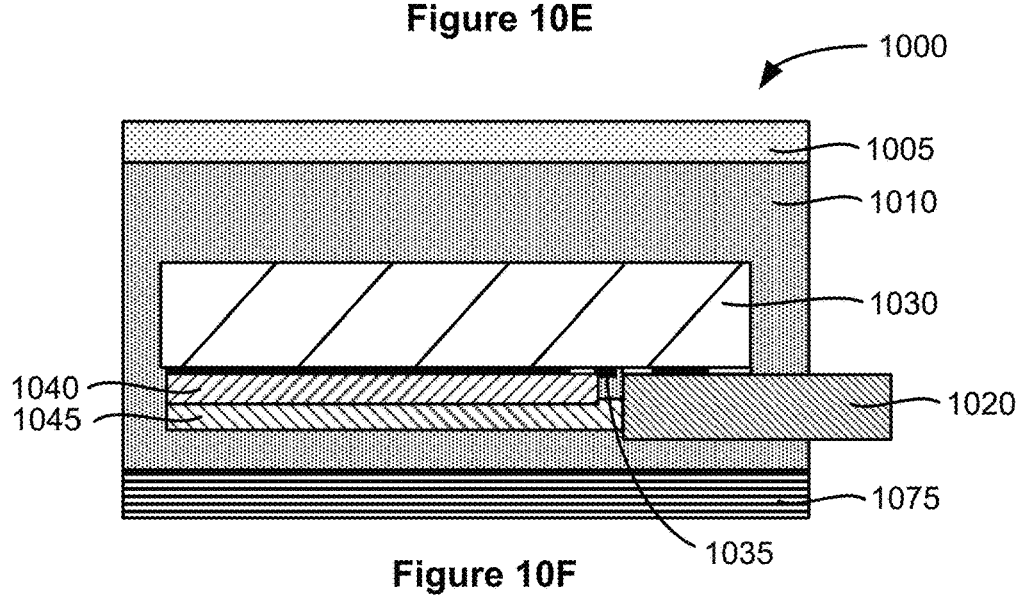

In the ultrasonic fingerprint sensor systems 1000 shown in FIGS. 10E-10F, the mechanical stress isolation layer 1010 may be formed as a molded structure around the ultrasonic fingerprint sensor system 1000. Instead of an adhesive layer positioned between the mechanical stress isolation layer 1010 and the sensor substrate 1030 and instead of an edge seal around the ultrasonic fingerprint sensor system 1000 in the "receiver down" orientation, the mechanical stress isolation layer 1010 may be molded to surround the ultrasonic fingerprint sensor system 1000 as a package. Thus, the mechanical stress isolation layer 1010 is formed on the front side, edges, and back side of the ultrasonic fingerprint sensor system 1000. In some implementations, a cavity may be formed in the molded mechanical stress isolation layer 1010 behind the sensor active area to serve as an air backing layer for improved acoustic isolation.

In FIG. 10E, the ultrasonic fingerprint sensor system 1000 includes a foam backing layer 1055 underlying the passivation layer 1050. The foam backing layer 1055 may serve one or both of a mechanical function (e.g., cushion) and acoustic function (e.g., reflection of ultrasonic waves). An electrical shield 1075 may be disposed on the back side of the ultrasonic fingerprint sensor system 1000, where the mechanical stress isolation layer 1010 on the back side is positioned between the electrical shield 1075 and the foam backing layer 1055. In some implementations, an air backing layer may be combined with the foam backing layer 1055 and both positioned between the transceiver electrode layer 1045 and the backside portion of the molded mechanical stress isolation layer 1010 to provide additional acoustic isolation.

In FIG. 10F, the ultrasonic fingerprint sensor system 1000 includes an electrical shield 1075 underlying the mechanical stress isolation layer 1010 on the back side. However, in contrast to FIG. 10E, the ultrasonic fingerprint sensor system 1000 does not include a foam backing layer or a passivation layer. In some implementations, an air backing layer may be formed in the molded mechanical stress isolation layer 1010 behind the sensor active area.

FIGS. 11A-11F show cross-sectional schematic views of various example ultrasonic sensor systems in a "receiver up" orientation according to some implementations. In the "receiver up" orientation, a piezoelectric transceiver layer is overlying a sensor substrate so that the sensor substrate is not in the acoustic path. Rather, a transceiver electrode layer and a passivation layer are in the acoustic path. An FPC may be coupled to the sensor substrate so that the FPC is overlying the sensor substrate in the "receiver up" orientation.

Figure 11A:
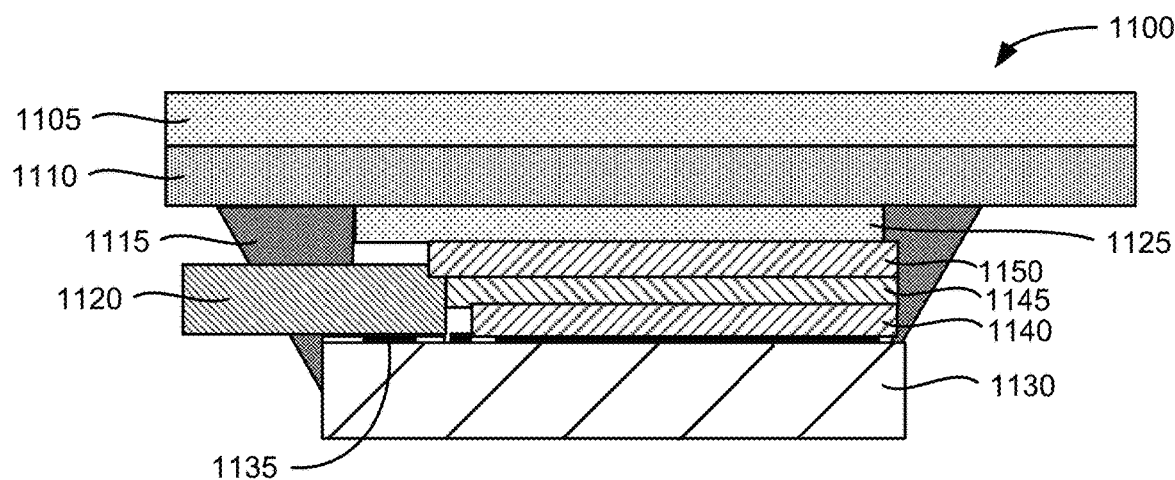
FIGS. 11A-11F show cross-sectional schematic views of various example ultrasonic sensor systems in a "receiver up" orientation according to some implementations.
Figure 11B:
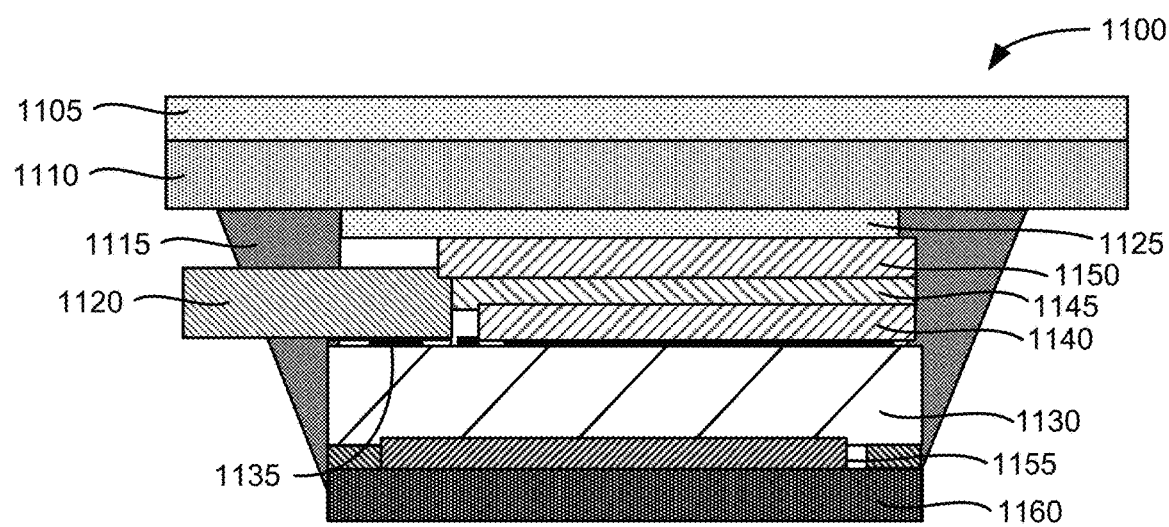
Figure 11C:
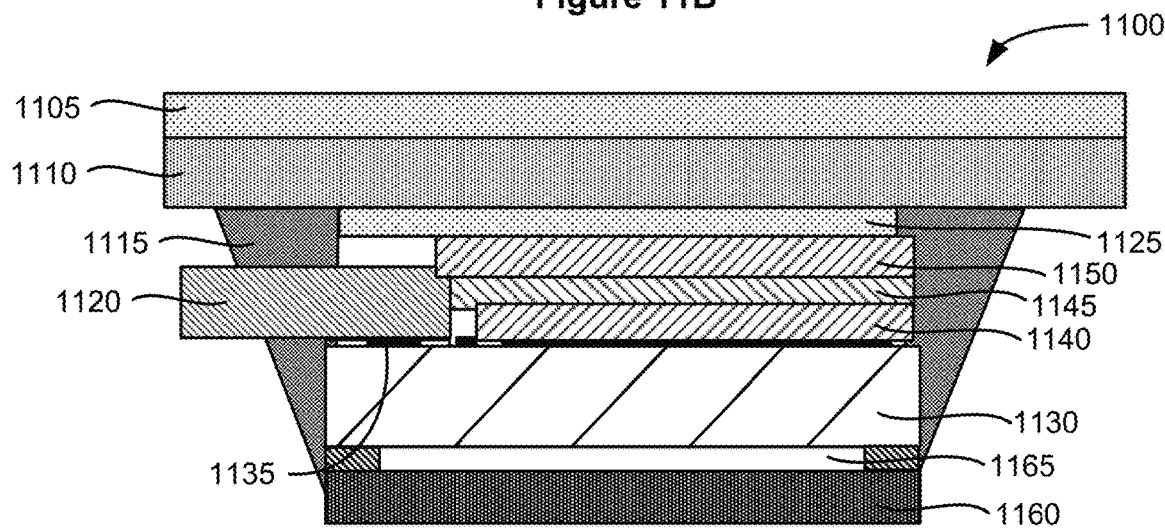
Figure 11D:
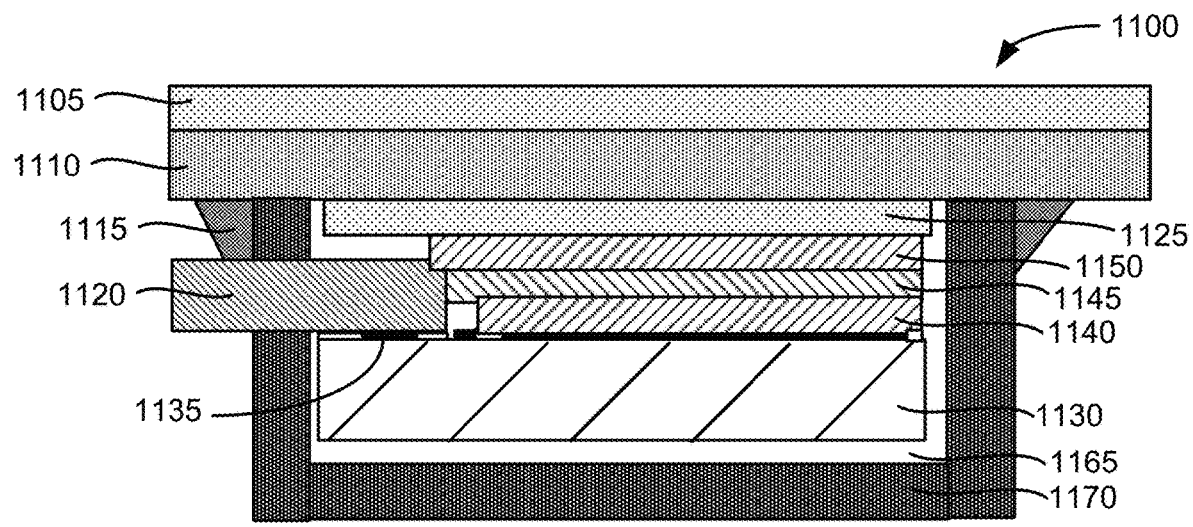
Figure 11E:
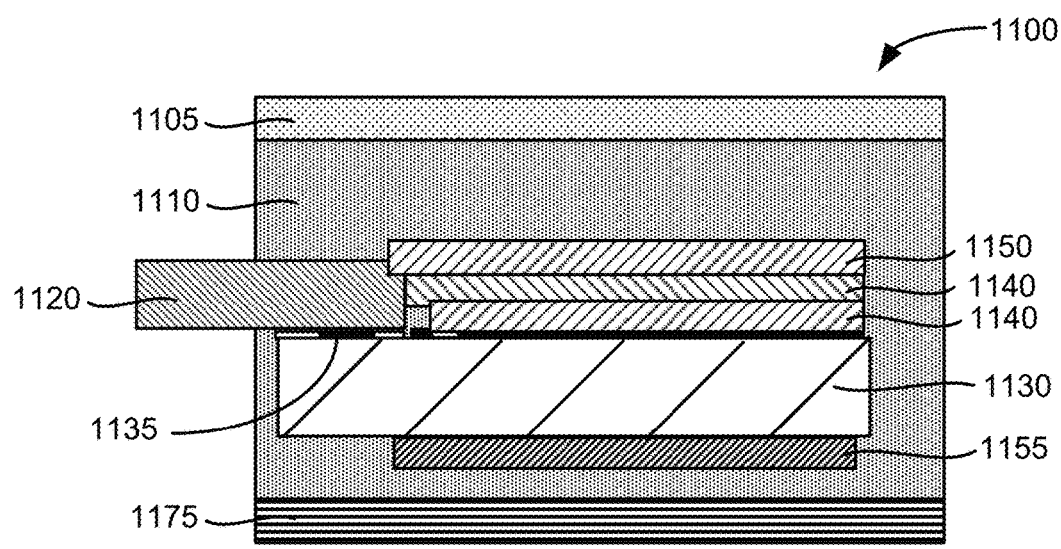
Figure 11F:
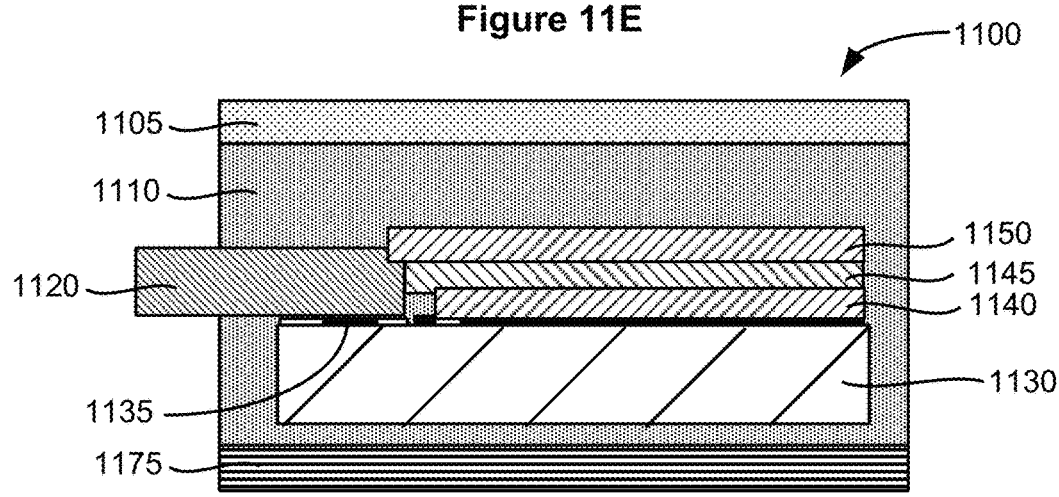

In FIGS. 11A-11F, each of the ultrasonic fingerprint sensor systems 1100 includes a sensor substrate 1130, a piezoelectric transceiver layer 1140, a transceiver electrode layer 1145, a passivation layer 1150, and an FPC 1120 coupled to the sensor substrate 1130 similar to that shown in FIGS. 11A-11F. Similar to the configurations shown in FIGS. 11A-11D, a mechanical stress isolation layer 1110 may be positioned between at least two adhesive layers 1105, 1125 as shown in FIGS. 11A-11D. Similar to the configurations shown in FIGS. 11E-11F, a mechanical stress isolation layer 1110 may be molded around the ultrasonic fingerprint sensor system 1100 as shown in FIGS. 11E-11F.

The ultrasonic fingerprint sensor system 1100 in the "receiver up" orientation includes the piezoelectric transceiver layer 1140 coupled to and overlying the sensor substrate 1130 with a plurality of sensor pixel circuits 1135 disposed thereon. The transceiver electrode layer 1145 may be coupled to and overlying the piezoelectric transceiver layer 1140, and the passivation layer 1150 may be overlying the transceiver electrode layer 1145 or at least portions of the transceiver electrode layer 1145. In FIG. 11B, a foam backing layer 1155 along with one or both of a stiffener 1160 and an electrical shield underlies the sensor substrate 1130 at the back side of the ultrasonic fingerprint sensor system 1100. In FIG. 11C, a cavity 1165 and one or both of a stiffener 1160 and an electrical shield underlies the sensor substrate 1130 at the back side of the ultrasonic fingerprint sensor system 1100. In FIG. 11D, a cavity 1165 and one or both of a housing 1170 and an electrical shield underlies the sensor substrate 1130 at the back side of the ultrasonic fingerprint sensor system 1100. In FIG. 11E, the mechanical stress isolation layer 1110 may be molded around the ultrasonic fingerprint sensor system 1100, where a foam backing layer 1155 underlies the sensor substrate 1130 and an electrical shield 1175 underlies the mechanical stress isolation layer 1110 at the back side of the ultrasonic fingerprint sensor system 1100. In FIG. 11F, the mechanical stress isolation layer 1110 may be molded around the ultrasonic fingerprint sensor system 1100, where an electrical shield 1175 underlies the mechanical stress isolation layer 1110 at the back side of the ultrasonic fingerprint sensor system 1100. There is no foam backing layer 1155. In some implementations, a cavity may be formed in the molded stress isolation material behind the sensor active area to serve as an air backing layer. In the implementations shown in FIGS. 11B-11D, the stiffener 1160 may be electrically grounded and serve as an electrical shield. In the implementations shown in FIGS. 11E-11F, the electrical shield 1175 may be electrically grounded and serve as a mechanical stiffener.

Figure 12:
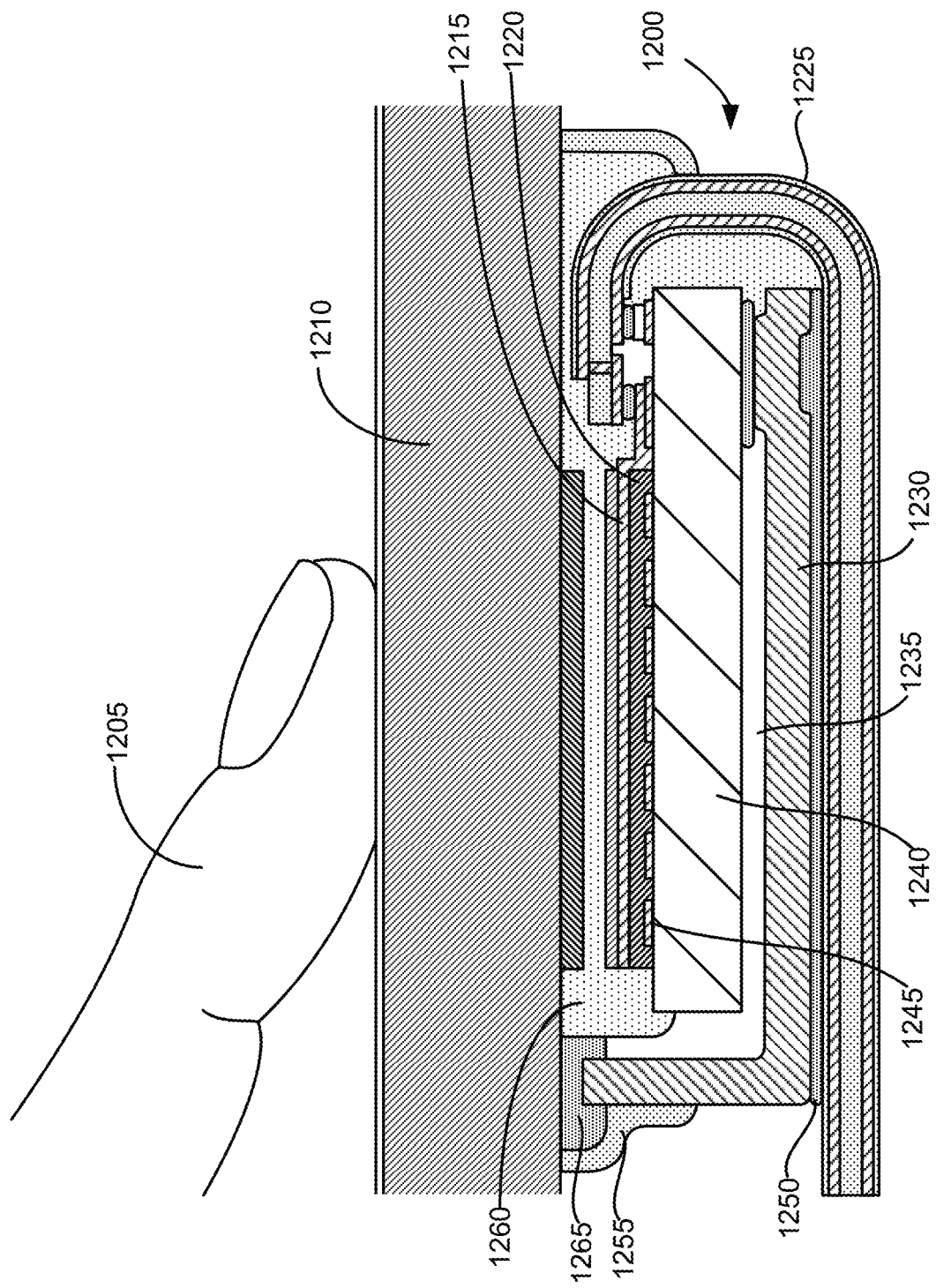
FIG. 12 shows a cross-sectional view of an example under-platen ultrasonic sensor system with a flexible printed circuit (FPC).

FIG. 12 shows a cross-sectional view of an example under-platen ultrasonic sensor system with a flexible printed circuit (FPC). In FIG. 12, an ultrasonic sensor system 1200 is located underneath or underlying a platen 1210. The platen 1210 may be deemed "in front of," "above," or "overlying" the ultrasonic sensor system 1200, and the ultrasonic sensor system 1200 may be deemed "behind," "below," or "underlying" the platen 1210. Such terms as used herein are relative terms depending on the orientation of the device. In some implementations, the ultrasonic sensor system 1200 is coupled to the platen 1210 by a first adhesive 1260. A finger 1205 may press against the platen 1210 to activate the ultrasonic sensor system 1200. In some implementations, the platen 1210 may be a cover glass of a display device (e.g., mobile device). In some implementations, the platen 1210 may include a portion of a display such as an organic light-emitting diode (OLED) or active matrix organic light-emitting diode (AMOLED) display.

The ultrasonic sensor system 1200 may include a sensor substrate 1240, a plurality of sensor circuits 1245 disposed on the sensor substrate 1240, a transceiver layer 1220, and an electrode layer 1215. The transceiver layer 1220 may be referred to as a "piezoelectric layer" or as a "piezoelectric transceiver layer." The electrode layer 1215 may be referred to as a "transceiver electrode layer." In some implementations, the transceiver layer 1220 may correspond to the piezoelectric transceiver layer 456 of FIG. 4B or may correspond to one or both of the piezoelectric receiver layer 436 and the piezoelectric transmitter layer 422 of FIG. 4A. The ultrasonic sensor system 1200 may further include a passivation layer (not shown). Different implementations may use different materials for the sensor substrate 1240. For example, the sensor substrate 1240 may include a silicon substrate, a silicon-on-insulator (SOI) substrate, a thin-film transistor (TFT) substrate, a glass substrate, a plastic substrate, a ceramic substrate, and/or a combination thereof.

The plurality of sensor circuits 1245 may be formed over or on the sensor substrate 1240, such as TFT circuits formed on a TFT substrate or complementary metal-oxide-semiconductor (CMOS) circuits formed on or in a silicon substrate. In some implementations, the transceiver layer 1220 may be positioned over the plurality of sensor circuits 1245. The transceiver layer 1220 may serve as both a transmitter and a receiver of ultrasonic waves, where the transceiver layer 1220 is configured to transmit at least one ultrasonic wave/signal and receive or detect at least one ultrasonic wave/signal. Accordingly, the transceiver layer 1220 may include one or more piezoelectric layers and one or more electrode layers to enable the transceiver layer to transmit and receive ultrasonic waves.

An ultrasonic wave is an acoustic wave that has a frequency above about 20 kHz. In some implementations, ultrasonic waves have a frequency between about 1 MHz and about 100 MHz, such as between about 5 MHz and about 20 MHz. Acoustic waves are longitudinal waves that have the same direction of vibration as their direction of travel. Acoustic waves push particles in a medium, whether the medium is a solid, liquid, or gas. Acoustic waves travel at the speed of sound, which depends on the medium that they are passing through. Acoustic impedance in a material measures the opposition to acoustic flow resulting from an acoustic pressure applied to the material. Acoustic impedance enables determination of the reflection and transmission of acoustic energy at boundaries. If the acoustic impedance of two media is very different, then most acoustic energy will be reflected, rather than transmitted across the boundary. Acoustic impedance may be measured in terms of Pascal-seconds per meter (Pa-s/m or kg/s/m2) with units of Rayls or MRayls.

The plurality of sensor circuits 1245 may include an array of thin-film transistor circuits. For example, the sensor circuits 1245 may include an array of pixel circuits, where each pixel circuit may include one or more TFTs. A pixel circuit may be configured to convert an electric charge generated by the transceiver layer proximate to the pixel circuit into an electrical signal in response to a received ultrasonic wave. Output signals from the sensor circuits 1245 may be sent to a controller or other circuitry for signal processing.

In some implementations, the transceiver electrode layer 1215 may be disposed, positioned, placed, or formed over the transceiver layer 1220. The transceiver electrode layer 1215 may include one or more electrically conductive layers/traces that are coupled to the transceiver layer 1220. In some implementations, the transceiver electrode layer 1215 may include silver ink. In some implementations, the transceiver electrode layer 1215 may include copper. Ultrasonic waves may be generated and transmitted by providing an electrical signal to the transceiver electrode layer 1215. In addition, a passivation layer (not shown) may be disposed, positioned, placed, or formed over at least portions of the transceiver electrode layer 1215. The passivation layer may include one or more layers of electrically insulating material. The sensor substrate 1240 and sensor circuits 1245, the piezoelectric transceiver layer 1220 and the transceiver electrode layer 1215 may be positioned under a platen 1210.

FIG. 12 shows a flexible printed circuit (FPC) 1225 coupled to the sensor substrate 1240. However, it will be understood in the present disclosure that the sensor substrate 1240 may be coupled to a rigid printed circuit board (PCB) or other circuitry. The FPC 1225 may be referred to as a flex tape, flex cable, flex circuit, or simply as "flex." The FPC 1225 may include one or more dielectric layers and one or more interconnects (e.g., traces, vias and pads). In some implementations, the FPC 1225 may be electrically coupled to a controller or other circuitry for signal processing of signals to/from the sensor circuits 1245. In some implementations, the FPC 1225 may wrap around from a front side of the ultrasonic sensor system 1200 to a back side of the ultrasonic sensor system 1200.

In FIG. 12, the ultrasonic sensor system 1200 may be attached to the platen 1210 using a first adhesive 1260 and an edge sealant 1255. The ultrasonic sensor system 1200 may further include a sensor housing or cap 1230 for protecting the ultrasonic sensor system 1200. The sensor housing 1230 may be coupled to a portion of the platen 1210 via a second adhesive 1265 and may be coupled to a portion of the sensor substrate 1240 and to a portion of the FPC 1225 via a third adhesive 1250. In some implementations, the sensor housing 1230 may be largely cantilevered over the active area of the sensor substrate 1240. The sensor housing 1230 may be coupled to the sensor substrate 1240 such that a cavity 1235 is formed between the back side of the sensor substrate 1240 and the sensor housing 1230. In some implementations, the sensor housing 1230 may include one or more layers of plastic or metal. In some implementations, the sensor housing 1230 and the cavity 1235 may allow the interface between the sensor substrate 1240 and the cavity 1235 to operate as an acoustic barrier for the ultrasonic sensor system 1200. In some implementations, the cavity 1235 may provide a space for accommodating an acoustic shielding structure that is configured to absorb, trap, or otherwise attenuate ultrasonic waves. The FPC 1225 may be wrapped around the sensor substrate 1240 and the sensor housing 1230, where the FPC 1225 is attached to a backside of the sensor housing 1230.

An under-platen ultrasonic sensor system 1200 may be provided in a display device as shown in FIG. 12, but an under-display ultrasonic sensor system is not necessarily provided in a display device as in an under-platen ultrasonic sensor system. Accordingly, a display device including an under-display ultrasonic sensor system may be constructed differently than an under-platen ultrasonic sensor system.

Figure 13:
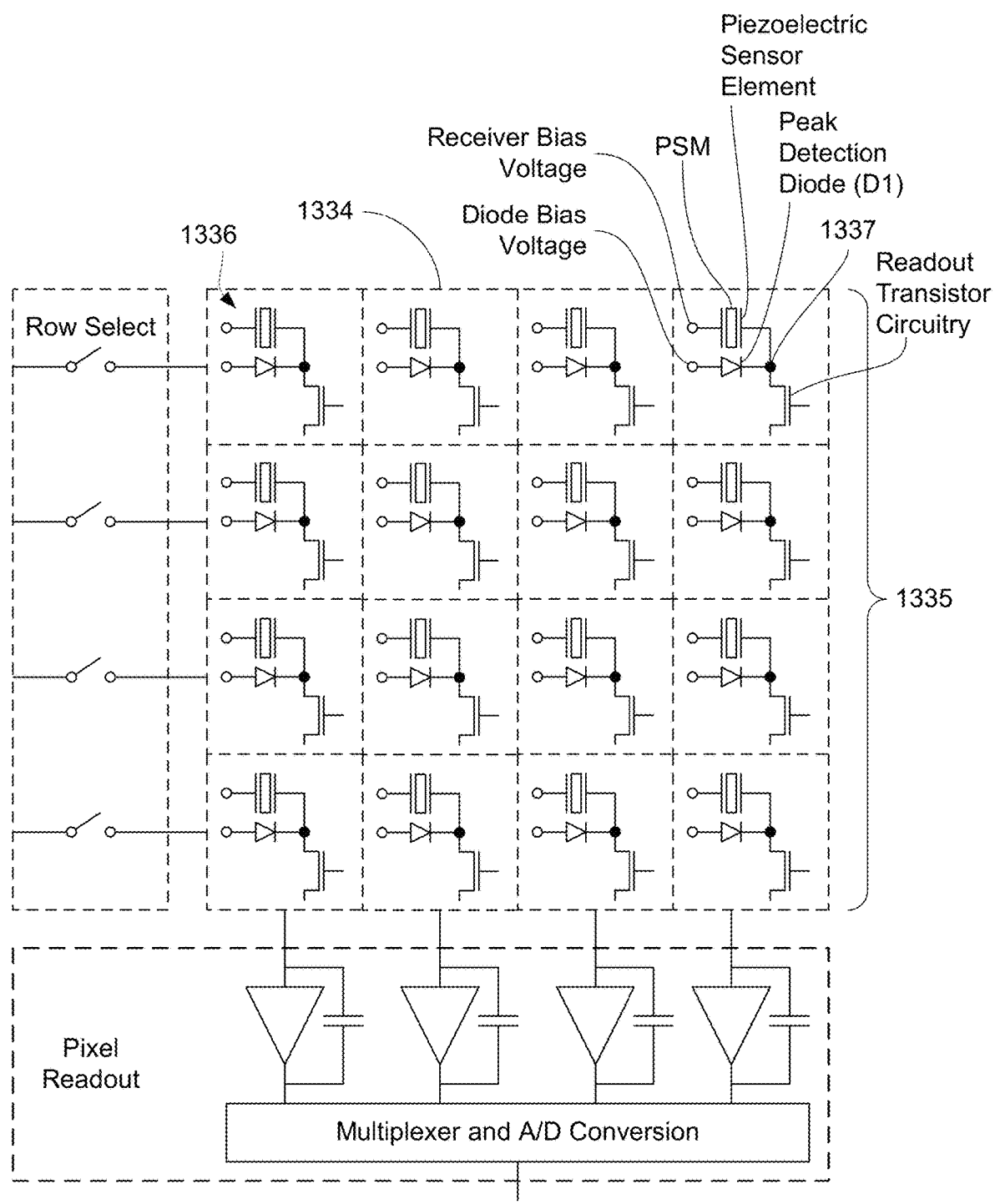
FIG. 13 representationally depicts aspects of a 4×4 pixel array of sensor pixels for an ultrasonic sensor system.

FIG. 13 representationally depicts aspects of a 4×4 pixel array of sensor pixels for an ultrasonic sensor system. Each pixel 1334 may be, for example, associated with a local region of piezoelectric sensor material (PSM), a peak detection diode (D1) and a readout transistor (M3); many or all of these elements may be formed on or in a substrate to form the pixel circuit 1336. In practice, the local region of piezoelectric sensor material of each pixel 1334 may transduce received ultrasonic energy into electrical charges. The peak detection diode D1 may register the maximum amount of charge detected by the local region of piezoelectric sensor material PSM. Each row of the pixel array 1335 may then be scanned, e.g., through a row select mechanism, a gate driver, or a shift register, and the readout transistor M3 for each column may be triggered to allow the magnitude of the peak charge for each pixel 1334 to be read by additional circuitry, e.g., a multiplexer and an A/D converter. The pixel circuit 1336 may include one or more TFTs to allow gating, addressing, and resetting of the pixel 1334.

Each pixel circuit 1336 may provide information about a small portion of the object detected by the ultrasonic sensor system. While, for convenience of illustration, the example shown in FIG. 13 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the target object.

Figure 14A:
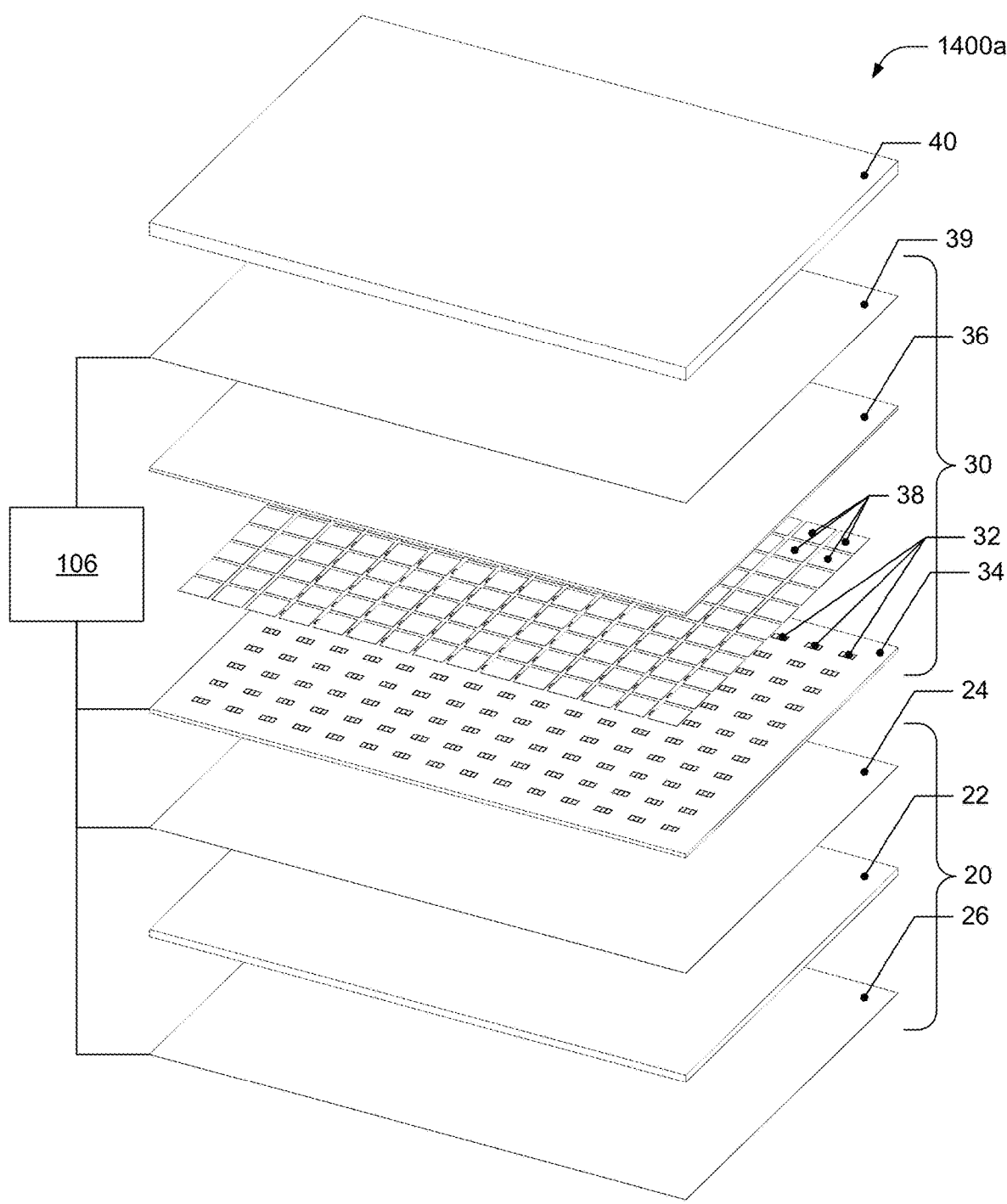
FIG. 14A shows an example of an exploded view of an ultrasonic sensor system.

FIG. 14A shows an example of an exploded view of an ultrasonic sensor system. In this example, the ultrasonic sensor system 1400a includes an ultrasonic transmitter 20 and an ultrasonic receiver 30 under a platen 40. According to some implementations, the ultrasonic receiver 30 may be an example of the ultrasonic sensor array 102 that is shown in FIG. 1 and described above. In some implementations, the ultrasonic transmitter 20 may be an example of the optional ultrasonic transmitter 108 that is shown in FIG. 1 and described above. However, some implementations of the ultrasonic sensor system 1400a (and some implementations of the ultrasonic sensor system 1400b that is described below with reference to FIG. 14B) do not include the ultrasonic transmitter 20. In some such implementations, the ultrasonic receiver 30 may be configured as an ultrasonic transceiver.

However, in the example shown in FIG. 14A, the ultrasonic transmitter 20 includes a substantially planar piezoelectric transmitter layer 22 and may be capable of functioning as a plane wave generator. Ultrasonic waves may be generated by applying a voltage to the piezoelectric layer to expand or contract the layer, depending upon the signal applied, thereby generating a plane wave. In this example, the control system 106 may be capable of causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This ultrasonic wave may travel towards a finger (or other object to be detected), passing through the platen 40. A portion of the wave not absorbed or transmitted by the object to be detected may be reflected so as to pass back through the platen 40 and be received by at least a portion of the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT elements, electrical interconnect traces and, in some implementations, one or more additional circuit elements such as diodes, capacitors, and the like. Each sensor pixel circuit 32 may be configured to convert an electric charge generated in the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into localized electrical charges by the piezoelectric receiver layer 36. These localized charges may be collected by the pixel input electrodes 38 and passed on to the underlying sensor pixel circuits 32. The charges may be amplified or buffered by the sensor pixel circuits 32 and provided to the control system 106.

The control system 106 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 106 may operate substantially as described above. For example, the control system 106 may be capable of processing the amplified signals received from the sensor pixel circuits 32.

The control system 106 may be capable of controlling the ultrasonic transmitter 20 and/or the ultrasonic receiver 30 to obtain ultrasonic image data, e.g., by obtaining fingerprint images. Whether or not the ultrasonic sensor system 1400a includes an ultrasonic transmitter 20, the control system 106 may be capable of obtaining attribute information from the ultrasonic image data. In some examples, the control system 106 may be capable of controlling access to one or more devices based, at least in part, on the attribute information. The ultrasonic sensor system 1400a (or an associated device) may include a memory system that includes one or more memory devices. In some implementations, the control system 106 may include at least a portion of the memory system. The control system 106 may be capable of obtaining attribute information from ultrasonic image data and storing the attribute information in the memory system. In some implementations, the control system 106 may be capable of capturing a fingerprint image, obtaining attribute information from the fingerprint image and storing attribute information obtained from the fingerprint image (which may be referred to herein as fingerprint image information) in the memory system. According to some examples, the control system 106 may be capable of capturing a fingerprint image, obtaining attribute information from the fingerprint image and storing attribute information obtained from the fingerprint image even while maintaining the ultrasonic transmitter 20 in an "off" state.

In some implementations, the control system 106 may be capable of operating the ultrasonic sensor system 1400a in an ultrasonic imaging mode or a force-sensing mode. In some implementations, the control system may be capable of maintaining the ultrasonic transmitter 20 in an "off" state when operating the ultrasonic sensor system in a force-sensing mode. The ultrasonic receiver 30 may be capable of functioning as a force sensor when the ultrasonic sensor system 1400a is operating in the force-sensing mode. In some implementations, the control system 106 may be capable of controlling other devices, such as a display system, a communication system, etc. In some implementations, the control system 106 may be capable of operating the ultrasonic sensor system 1400a in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is capable of imaging fingerprints in a force detection mode or a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 μm thick and a PVDF-TrFE receiver layer 36 is approximately 12 μm thick. Example frequencies of the ultrasonic waves may be in the range of 5 MHz to 30 MHz, with wavelengths on the order of a millimeter or less.

Figure 14B:
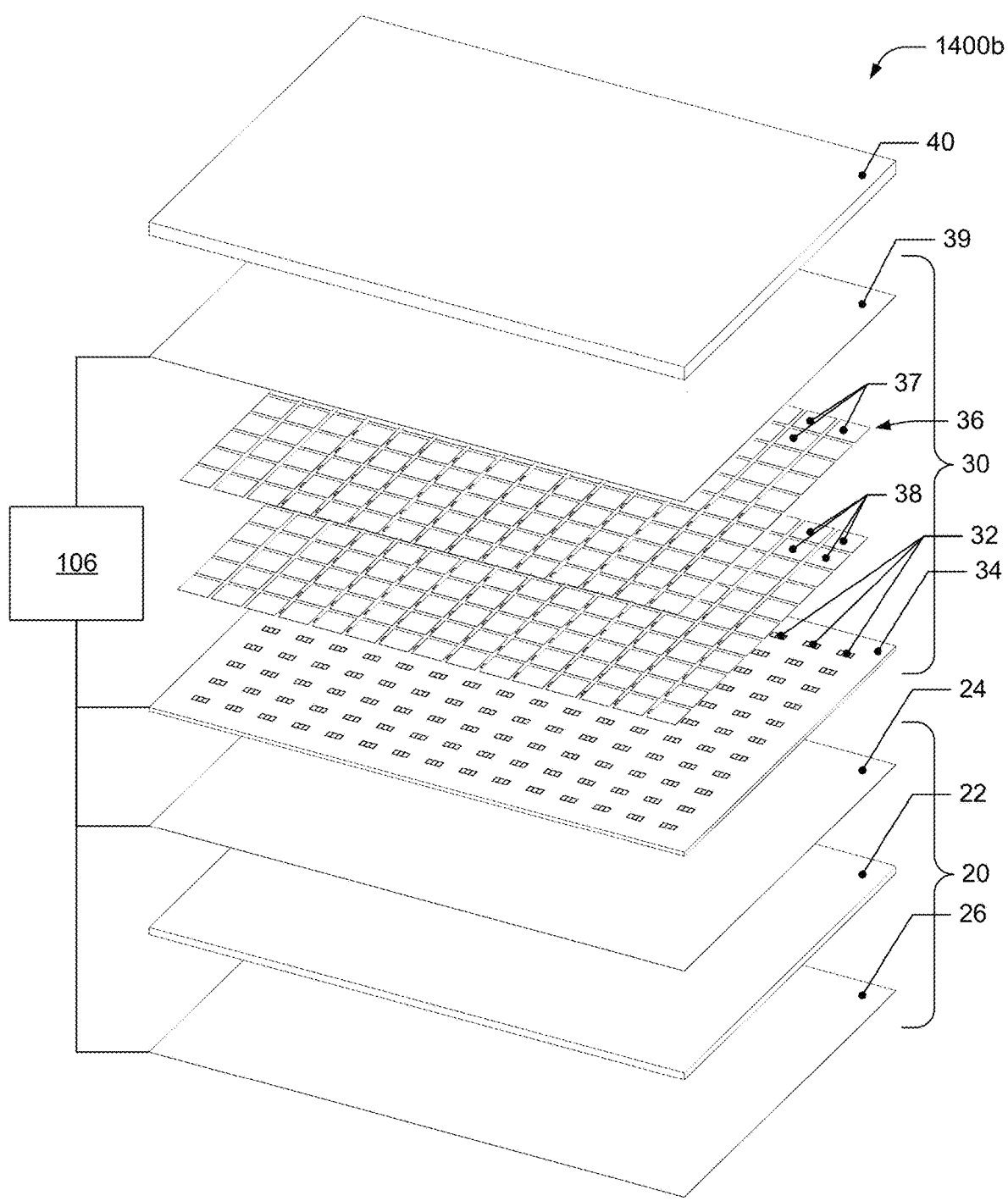
FIG. 14B shows an exploded view of an alternative example of an ultrasonic sensor system.

FIG. 14B shows an exploded view of an alternative example of an ultrasonic sensor system. In this example, the piezoelectric receiver layer 36 has been formed into discrete elements 37. In the implementation shown in FIG. 14B, each of the discrete elements 37 corresponds with a single pixel input electrode 38 and a single sensor pixel circuit 32. However, in alternative implementations of the ultrasonic sensor system 1400b, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 14A and 14B show example arrangements of ultrasonic transmitters and receivers in an ultrasonic sensor system, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor array (e.g., a single-layer transmitter and receiver). In some implementations, the ultrasonic sensor system may include an acoustic delay layer. For example, an acoustic delay layer may be incorporated into the ultrasonic sensor system between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic sensor system is arriving at the ultrasonic receiver 30. In some implementations, the substrate 34 and/or the platen 40 may serve as an acoustic delay layer.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus, comprising:
a piezoelectric receiver array configured to be coupled to a first side of a display; and
a control system, at least part of which is coupled to the piezoelectric receiver array, the control system configured to:
acquire first image data from at least a first portion of the piezoelectric receiver array, the first image data corresponding to signals produced by at least the first portion of the piezoelectric receiver array in response to at least one of an acoustic signal or a mechanical deformation caused by a target object in contact with a surface proximate a second side of the display during a first acquisition time window;
detect a first doublet pattern in the first image data, the first doublet pattern comprising a first area of the piezoelectric receiver array from which signals below a threshold signal level have been received and a second area of the piezoelectric receiver array from which signals above the threshold signal level have been received, the first area being adjacent to the second area;
determine one or more first doublet pattern characteristics;
determine, based on at least one first doublet pattern characteristic, at least one of a first position of the target object on the surface, a first force of the target object on the surface or a first direction of movement of the target object relative to the surface;
determine a first centroid of the first area;
determine a second centroid of the second area;
determine a displacement between the first centroid and the second centroid; and estimate a velocity of the target object based, at least in part, on the displacement.

2. The apparatus of claim 1, wherein the first doublet pattern characteristics include one or more characteristics selected from a group consisting of a first area radius, a second area radius, a first area centroid location, a second area centroid location and a direction from the first area centroid location to the second area centroid location.

3. The apparatus of claim 1, wherein the control system is configured to subtract at least a portion of a background image data set from the first image data, the background image data set corresponding to at least the portion of the piezoelectric receiver array.

4. The apparatus of claim 1, wherein the piezoelectric receiver array comprises an ultrasonic receiver array.

5. The apparatus of claim 1, wherein the control system is configured to:
determine the first direction of movement of the target object relative to the surface; and
select a scanning area of the piezoelectric receiver array based at least in part on the first direction of movement.

6. The apparatus of claim 1, wherein the control system is configured to:
acquire second image data from the piezoelectric receiver array, the second image data corresponding to a signal received from the piezoelectric receiver array during a second acquisition time window;
detect a second doublet pattern in the second image data;
determine a second doublet pattern location;
determine a difference between the second doublet pattern location and a first doublet pattern location; and
determine, based on the difference, a velocity of the target object relative to the surface.

7. The apparatus of claim 6, wherein the control system is configured to:
determine one or more second doublet pattern characteristics; and
determine, based on at least one second doublet pattern characteristic, at least one of a second force of the target object on the surface or a second direction of movement of the target object relative to the surface.

8. The apparatus of claim 6, wherein the control system is configured to subtract at least a portion of the first image data from a corresponding portion of the second image data.

9. The apparatus of claim 1, wherein the control system is configured to provide fingerprint sensor functionality.

10. The apparatus of claim 1, wherein the control system is configured to provide signature recognition functionality.

11. The apparatus of claim 10, wherein the signature recognition functionality involves detecting a current pattern of forces in each of a plurality of signature locations of a currently-detected signature and matching the current pattern of forces with a stored pattern of forces indicated by stored signature data of an authorized person.

12. A display device that includes the apparatus of claim 1 and the display.

13. The apparatus of claim 1, wherein the control system is configured to determine, based on a shape of the first doublet pattern, a tilt angle of the target object relative to the surface.

14. The apparatus of claim 1, wherein the control system is configured to estimate the first force of the target object on the surface based, at least in part, on at least one of a first magnitude of one or more signals in the first area or a second magnitude of one or more signals in the second area.

15. The apparatus of claim 14, wherein the control system is configured to estimate the first force of the target object on the surface based, at least in part, on a difference between the first magnitude and the second magnitude.

16. The apparatus of claim 14, wherein the control system is configured to estimate the first force of the target object on the surface based, at least in part, at least one of a difference between the first magnitude and the threshold signal level or a difference between the second magnitude and the threshold signal level.

17. A method of determining information regarding one or more interactions between a target object and a display device, the method comprising:
acquiring first image data from at least a first portion of a piezoelectric receiver array, the first image data corresponding to signals produced by at least the first portion of the piezoelectric receiver array in response to at least one of an acoustic signal or a mechanical deformation caused by a target object in contact with a surface proximate a second side of the display during a first acquisition time window;
detecting a first doublet pattern in the first image data, the first doublet pattern comprising a first area of the piezoelectric receiver array from which signals below a threshold signal level have been received and a second area of the piezoelectric receiver array from which signals above the threshold signal level have been received, the first area being adjacent to the second area;
determining one or more first doublet pattern characteristics;
determining, based on at least one first doublet pattern characteristic, at least one of a first position of the target object on the surface, a first force of the target object on the surface or a first direction of movement of the target object relative to the surface;
determining a first centroid of the first area;
determining a second centroid of the second area;
determining a displacement between the first centroid and the second centroid; and
estimating a velocity of the target object based, at least in part, on the displacement.

18. The method of claim 17, wherein the first doublet pattern characteristics include one or more characteristics selected from a group consisting of a first area radius, a second area radius, a first area centroid location, a second area centroid location and a direction from the first area centroid location to the second area centroid location.

19. The method of claim 17, further comprising subtracting at least a portion of a background image data set from the first image data, the background image data set corresponding to at least the portion of the piezoelectric receiver array.

20. The method of claim 17, wherein the piezoelectric receiver array comprises an ultrasonic receiver array.

21. The method of claim 17, further comprising:
determining the first direction of movement of the target object relative to the surface; and
selecting a scanning area of the piezoelectric receiver array based at least in part on the first direction of movement.

22. The method of claim 17, further comprising:
acquiring second image data from the piezoelectric receiver array, the second image data corresponding to a signal received from the piezoelectric receiver array during a second acquisition time window;
detecting a second doublet pattern in the second image data;
determining a second doublet pattern location;

determining a difference between the second doublet pattern location and a first doublet pattern location; and determining, based on the difference, a velocity of the target object relative to the surface.

23. The method of claim 22, further comprising:

determining one or more second doublet pattern characteristics; and determining, based on at least one second doublet pattern characteristic, at least one of a second force of the target object on the surface or a second direction of movement of the target object relative to the surface.

24. The method of claim 23, further comprising subtracting at least a portion of the first image data from a corresponding portion of the second image data.

25. One or more non-transitory media having software stored thereon, the software including instructions for controlling one or more devices to perform a method of determining information regarding one or more interactions between a target object and a display device, the method comprising:

acquiring first image data from at least a first portion of a piezoelectric receiver array, the first image data corresponding to signals produced by at least the first portion of the piezoelectric receiver array in response to at least one of an acoustic signal or a mechanical deformation caused by a target object in contact with a surface proximate a second side of the display during a first acquisition time window;

detecting a first doublet pattern in the first image data, the first doublet pattern comprising a first area of the piezoelectric receiver array from which signals below a threshold signal level have been received and a second area of the piezoelectric receiver array from which signals above the threshold signal level have been received, the first area being adjacent to the second area;

determining one or more first doublet pattern characteristics;

determining, based on at least one first doublet pattern characteristic, at least one of a first position of the target object on the surface, a first force of the target object on the surface or a first direction of movement of the target object relative to the surface;

determining a first centroid of the first area;

determining a second centroid of the second area;

determining a displacement between the first centroid and the second centroid; and estimating a velocity of the target object based, at least in part, on the displacement.

26. The one or more non-transitory media of claim 25, wherein the first doublet pattern characteristics include one or more characteristics selected from a group consisting of a first area radius, a second area radius, a first area centroid location, a second area centroid location and a direction from the first area centroid location to the second area centroid location.

27. The one or more non-transitory media of claim 25, wherein the method further comprises:

acquiring second image data from the piezoelectric receiver array, the second image data corresponding to an acoustic signal received by the piezoelectric receiver array from the target object during a second acquisition time window;

detecting a second doublet pattern in the second image data;

determining a second doublet pattern location;

determining a difference between the second doublet pattern location and a first doublet pattern location; and determining, based on the difference, a velocity of the target object relative to the surface.

\* \* \* \* \*